US011907508B1

(12) United States Patent
Kumar et al.

(10) Patent No.: US 11,907,508 B1
(45) Date of Patent: Feb. 20, 2024

(54) CONTENT ANALYTICS AS PART OF CONTENT CREATION

(71) Applicant: Adobe Inc., San Jose, CA (US)

(72) Inventors: Yaman Kumar, New Delhi (IN); Somesh Singh, Lucknow (IN); William Brandon George, Pleasant Grove, UT (US); Timothy Chia-chi Liu, San Francisco, CA (US); Suman Basetty, Fremont, CA (US); Pranjal Prasoon, Ranchi (IN); Nikaash Puri, New Delhi (IN); Mihir Naware, Redwood City, CA (US); Mihai Corlan, San Jose, CA (US); Joshua Marshall Butikofer, Draper, UT (US); Abhinav Chauhan, Saratoga, CA (US); Kumar Mrityunjay Singh, Bengaluru (IN); James Patrick O'Reilly, Oakland, CA (US); Hyman Chung, San Ramon, CA (US); Lauren Dest, Austin, TX (US); Clinton Hansen Goudie-Nice, Salt Lake City, UT (US); Brandon John Pack, Sandy, UT (US); Balaji Krishnamurthy, Noida (IN); Kunal Kumar Jain, Chennai (IN); Alexander Klimetschek, San Francisco, CA (US); Matthew William Rozen, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/133,725

(22) Filed: Apr. 12, 2023

(51) Int. Cl.
 *G06F 3/0484* (2022.01)
 *G06F 18/2415* (2023.01)
 (Continued)

(52) U.S. Cl.
 CPC .......... *G06F 3/0484* (2013.01); *G06F 3/0482* (2013.01); *G06F 18/2415* (2023.01);
 (Continued)

(58) Field of Classification Search
 CPC ..................................... G06F 3/0484
 (Continued)

(56) References Cited

U.S. PATENT DOCUMENTS 8,510,644 B2 * 8/2013 Rajkumar ............... G06F 16/70
 715/201
9,760,631 B1 * 9/2017 Broxton ................. G06Q 30/02
 (Continued)

OTHER PUBLICATIONS

"Colour metric", Thiadmer Riemersma, CompuPhase [retrieved Apr. 24, 2023]. Retrieved from the Internet <https://www.compuphase.com/cmetric.htm>., May 23, 2019, 5 Pages.
(Continued)

*Primary Examiner* — Reza Nabi
(74) *Attorney, Agent, or Firm* — FIG. 1 Patents

(57) ABSTRACT

Content creation techniques are described that leverage content analytics to provide insight and guidance as part of content creation. To do so, content features are extracted by a content analytics system from a plurality of content and used by the content analytics system as a basis to generate a content dataset. Event data is also collected by the content analytics system from an event data source. Event data describes user interaction with respective items of content, including subsequent activities in both online and physical environments. The event data is then used to generate an event dataset. An analytics user interface is then generated by the content analytics system using the content dataset and the event dataset and is usable to guide subsequent content creation and editing.

20 Claims, 22 Drawing Sheets

(51) Int. Cl.
- *G06V 10/40* (2022.01)
- *G06V 10/764* (2022.01)
- *G06F 3/0482* (2013.01)
- *G06T 11/20* (2006.01)
- *G06F 40/166* (2020.01)
- *G06F 40/151* (2020.01)

(52) U.S. Cl.
CPC .......... *G06F 40/151* (2020.01); *G06F 40/166* (2020.01); *G06T 11/206* (2013.01); *G06V 10/40* (2022.01); *G06V 10/764* (2022.01); *G06T 2200/24* (2013.01)

(58) Field of Classification Search
USPC ....................................................... 715/202
See application file for complete search history.

(56) References Cited

U.S. PATENT DOCUMENTS

| | | | |
|---|---|---|---|
| 9,904,661 B2* | 2/2018 | Gorelik | H04L 63/1416 |
| 10,466,869 B2* | 11/2019 | Liu | G06F 16/26 |
| 10,909,604 B1* | 2/2021 | Zappella | G06N 20/00 |
| 11,392,751 B1* | 7/2022 | Szarvas | G06N 3/08 |
| 2013/0179217 A1* | 7/2013 | Newton | G06F 16/951 |
| | | | 705/7.29 |
| 2015/0302755 A1* | 10/2015 | Breck | G09B 5/12 |
| | | | 434/362 |
| 2016/0103904 A1* | 4/2016 | Greenberg | G06F 40/103 |
| | | | 707/738 |
| 2016/0171511 A1* | 6/2016 | Goel | G06Q 30/0201 |
| | | | 705/7.29 |
| 2017/0070785 A1* | 3/2017 | Zou | H04N 21/4821 |
| 2017/0140249 A1* | 5/2017 | Lee | G06T 11/60 |
| 2020/0360794 A1* | 11/2020 | Intonato | G09B 19/0038 |
| 2021/0019567 A1* | 1/2021 | Gandhi | G06N 5/02 |
| 2021/0073583 A1* | 3/2021 | Dagan | G06F 18/2178 |
| 2021/0081470 A1* | 3/2021 | Fisher | H04L 67/10 |
| 2021/0089570 A1* | 3/2021 | Hunter | G06F 18/21 |
| 2021/0117736 A1* | 4/2021 | Merler | G06N 5/04 |
| 2021/0209425 A1* | 7/2021 | Nataraj | G06V 30/248 |
| 2021/0281650 A1* | 9/2021 | George | H04L 67/146 |
| 2021/0373726 A1* | 12/2021 | Boyd | G06F 18/24 |
| 2022/0027176 A1* | 1/2022 | McLachlan | G06Q 40/02 |
| 2022/0114326 A1* | 4/2022 | Bedi | G06F 40/106 |
| 2022/0198951 A1* | 6/2022 | Carroll | G06Q 10/10 |
| 2023/0070390 A1* | 3/2023 | Weng | G06F 40/109 |
| 2023/0188792 A1* | 6/2023 | Sahasi | H04N 21/4668 |
| | | | 725/46 |
| 2023/0325944 A1* | 10/2023 | Dejoux | H04L 51/52 |
| | | | 705/319 |

OTHER PUBLICATIONS

"Earn for your writing", Medium [retrieved Dec. 1, 2022]. Retrieved from the Internet <https://medium.com/earn>., 4 Pages.

"medium.com SEO Analysis & Statistics", SEOMoz, Inc. [retrieved Dec. 1, 2022]. Retrieved from the Internet <https://moz.com/domain-analysis/medium.com>., 5 Pages.

"Sensational Color", Kate Smith LLC [retrieved Apr. 24, 2023]. Retrieved from the Internet <https://www.sensationalcolor.com/color-temperature/>., 9 Pages.

"Twitter Usage Statistics", Internet Live Stats [retrieved Dec. 6, 2022]. Retrieved from the Internet <https://www.internetlivestats.com/twitter-statistics/>., 8 Pages.

"What is Medium", Medium [retrieved Dec. 1, 2022]. Retrieved from the Internet <https://medium.com/about>., 6 Pages.

"YouTube for Press", Youtube Official Blog [retrieved Dec. 6, 2022]. Retrieved from the Internet <https://blog.youtube/press/>., 11 Pages.

Athey, Susan , "Beyond prediction: Using big data for policy problems", Science, vol. 355, No. 6324 [retrieved Dec. 1, 2022]. Retrieved from the Internet <https://scholar.harvard.edu/files/people_analytics/files/beyond_prediction.pdf>., Feb. 2017, 4 Pages.

Bandari, Roja et al., "The Pulse of News in Social Media: Forecasting Popularity", Cornell University arXiv, arXiv.org [retrieved Dec. 1, 2022]. Retrieved from the Internet <https://arxiv.org/pdf/1202.0332.pdf>., Feb. 2, 2012, 8 Pages.

Beltagy, Iz et al., "Longformer: The Long-Document Transformer", Cornell University arXiv, arXiv.org [retrieved Dec. 1, 2022]. Retrieved from the Internet <https://arxiv.org/pdf/2004.05150.pdf>., Dec. 2, 2020, 17 Pages.

Botticello, Casey , "How Much Money Can You Make Writing for Medium?", Blogging Guide [retrieved Dec. 1, 2022]. Retrieved from the Internet <https://medium.com/blogging-guide/how-much-money-can-you-make-writing-for-medium-a3cf0c9c7533>., Aug. 18, 2018, 24 Pages.

Callegaro, Mario et al., "The role of surveys in the era of "big data"", in: The Palgrave handbook of Survey Research, Palgrave Macmillan [retrieved Dec. 1, 2022]. Retrieved from the Internet <https://doi.org/10.1007/978-3-319-54395-6>., Jan. 22, 2018, 19 Pages.

Edwards, Jim , "$132 million later, Ev Williams says he is raising even more money for Medium", Business Insider India [online] [retrieved Dec. 1, 2022]. Retrieved from the Internet <https://www.businessinsider.in/lyft-removed-the-option-to-split-ride-fares-with-other-passengers-but-says-an-easier-option-is-coming-soon/articleshow/66548306.cms>., Nov. 9, 2018, 35 Pages.

Egami, Naoki et al., "How to Make Causal Inferences Using Texts", Cornell University arXiv, arXiv.org [retrieved Dec. 1, 2022]. Retrieved from the Internet <https://arxiv.org/pdf/1802.02163.pdf>., Feb. 6, 2018, 47 Pages.

Feng, Jean et al., "Sparse-Input Neural Networks for High-dimensional Nonparametric Regression and Classification", Cornell University arXiv, arXiv.org [retrieved Dec. 1, 2022]. Retrieved from the Internet <https://arxiv.org/pdf/1711.07592.pdf>., Jun. 21, 2019, 37 Pages.

Gangl, Markus , "Causal inference in sociological research", Annual Review of Sociology, vol. 36 [retrieved Dec. 13, 2022]. Retrieved from the Internet <https://doi.org/10.1146/annurev.soc.012809.102702>., Oct. 2010, 30 Pages.

Gelli, Francesco et al., "Image Popularity Prediction in Social Media Using Sentiment and Context Features", MM '15: Proceedings of the 23rd ACM international conference on Multimedia [retrieved Dec. 1, 2022]. Retrieved from the Internet <https://asset-pdf.scinapse.io/prod/2090059852/2090059852.pdf>., Oct. 13, 2015, 4 Pages.

Hagar, Nick et al., "Optimizing Content with A/B Headline Testing: Changing Newsroom Practices", Media and Communication, vol. 7, No. 1 [retrieved Dec. 1, 2022]. Retrieved from the Internet <https://pdfs.semanticscholar.org/f3fb/92658537d7a6c5a552300fd0ff70366b6941.pdf>., Feb. 19, 2019, 11 Pages.

Hair, Joseph et al., "Data, measurement, and causal inferences in machine learning: opportunities and challenges for marketing", Journal of Marketing Theory and Practice vol. 29 [retrieved Dec. 1, 2022]. Retrieved from the Internet <https://doi.org/10.1080/10696679.2020.1860683>., Jan. 11, 2021, 13 Pages.

Hessel, Jack et al., "Something's Brewing! Early Prediction of Controversy-causing Posts from Discussion Features", Cornell University arXiv, arXiv.org [retrieved Dec. 1, 2022]. Retrieved from the Internet <https://arxiv.org/pdf/1904.07372.pdf>., May 14, 2019, 12 Pages.

Hofman, Jake et al., "Integrating explanation and prediction in computational social science", Nature, vol. 595 [retrieved Dec. 1, 2022]. Retrieved from the Internet <http://www.eliassi.org/explanation-vs-prediction.pdf>., Jun. 30, 2021, 8 Pages.

Hofman, Jake et al., "Prediction and explanation in social systems", Science, vol. 355, No. 6324 [retrieved Dec. 1, 2022]. Retrieved from the Internet <http://faculty.washington.edu/jwilker/559/prediction.pdf>., Feb. 3, 2017, 4 Pages.

Holland, Paul , "Statistics and causal inference", Journal of the American Statistical Association, vol. 81 [retrieved Dec. 1, 2022]. Retrieved from the Internet <http://www.fitelson.org/woodward/holland.pdf>., Mar. 12, 2012, 16 Pages.

(56) References Cited

OTHER PUBLICATIONS

Holliman, Geraint et al., "Business to business digital content marketing: marketers' perceptions of best practice", Journal of Research in Interactive Marketing [retrieved Dec. 1, 2022]. Retrieved from the Internet <https://e-space.mmu.ac.uk/579029/2/B2BContentMarketingJRIMREV11052014editsoffSUB.pdf>., Oct. 7, 2014, 32 Pages.

Howard, Rob , "I just made $76 writing for Medium members. Here's what I learned . . . ", Medium [online] [retrieved Dec. 1, 2022]. Retrieved from the Internet <https://medium.com/the-mission/i-just-made-76-writing-for-medium-members-heres-what-i-learned-9cbb85abfc36>., Sep. 11, 2017, 5 Pages.

Huang, Jianyi , "Predicting the active period of popularity evolution: A case study on Twitter hashtags", Information Sciences, vol. 512 [retrieved Dec. 13, 2022]. Retrieved from the Internet <https://doi.org/10.1016/j.ins.2019.04.028>., Feb. 1, 2020, 12 Pages.

Huang, Ming-Hui et al., "A strategic framework for artificial intelligence in marketing", Journal of the Academy of Marketing Science, vol. 49, No. 1 [retrieved Dec. 1, 2022]. Retrieved from the Internet <10.1007/s11747-020-00749-9>, Jan. 2021, 22 Pages.

Hulland, John et al., "Marketing survey research best practices: evidence and recommendations from a review of JAMS articles", Journal of the Academy of Marketing Science [retrieved Dec. 1, 2022]. Retrieved from the Internet <http://www.personal.psu.edu/jxb14/IPSS/materials/Hullandetal2017.pdf>., Apr. 10, 2017, 17 Pages.

Hünermund, Paul et al., "Causal Machine Learning and Business Decision Making", [retrieved Dec. 1, 2022]. Retrieved from the Internet <https://papers.ssrn.com/sol3/papers.cfm?abstract_id=3867326>., Feb. 19, 2022, 52 Pages.

Hutto, C et al., "Vader: A Parsimonious Rule-Based Model for Sentiment Analysis of Social Media Text", vol. 8 No. 1 (2014): Eighth International AAAI Conference on Weblogs and Social Media [retrieved Dec. 1, 2022]. Retrieved from the Internet <https://ojs.aaai.org/index.php/ICWSM/article/view/14550/14399>., May 16, 2014, 10 Pages.

Imbens, Guido et al., "Causal Inference for Statistics, Social, and Biomedical Sciences", Cambridge University Press, New York [retrieved Dec. 1, 2022]. Retrieved from the Internet <https://wiki.swarma.org/images/5/54/-Guido_W._Imbens%2C_Donald_B._Rubin-_Causal_Inferenc%28z-lib.org%29.pdf>., 2015, 646 Pages.

Joo, Jungseock et al., "Automated Facial Trait Judgment and Election Outcome Prediction: Social Dimensions of Face", IEEE International Conference on Computer Vision (ICCV) [retrieved Dec. 1, 2022]. Retrieved from the Internet <http://www.stat.ucla.edu/~sczhu/papers/Conf_2015/face_trait_ICCV15.pdf>., Dec. 7, 2015, 9 Pages.

Keuschnigg, Marc et al., "Analytical sociology and computational social science", Journal of Computational Social Science, vol. 1, No. 1 [retrieved Dec. 1, 2022]. Retrieved from the Internet <https://asset-pdf.scinapse.io/prod/2768731445/2768731445.pdf>., Feb. 12, 2018, 12 Pages.

Kç, Ali Aydin et al., "A comparative study of Artificial Neural Networks and Logistic Regression for classification of marketing campaign results", Mathematical and Computational Applications, vol. 18, No. 3 [retrieved Dec. 1, 2022]. Retrieved from the Internet <https://pdfs.semanticscholar.org/eca3/aab293fbe911ce8b9a8af7bf6431e695c398.pdf>., 2013, 7 Pages.

Koch, Bernard et al., "Deep Learning of Potential Outcomes", Cornell University arXiv, arXiv.org [retrieved Dec. 1, 2022]. Retrieved from the Internet <https://arxiv.org/pdf/2110.04442.pdf>., Oct. 9, 2021, 51 Pages.

Koiso-Kanttila, Nina , "Digital Content Marketing: A Literature Synthesis", Journal of Marketing Management vol. 20 [retrieved Dec. 13, 2022]. Retrieved from the Internet <https://doi.org/10.1362/026725704773041122>., Aug. 9, 2010, 23 Pages.

Kumar, Yaman et al., "US Application as Filed", U.S. Appl. No. 18/304,534, filed Apr. 21, 2023, 61 pages.

Kumar, Yaman et al., "US Application as Filed", U.S. Appl. No. 18/133,725, filed 04/12/20230, 73 pages.

Ma, Liye et al., "Machine learning and AI in marketing—Connecting computing power to human insights", International Journal of Research in Marketing, vol. 37, No. 3 [retrieved Dec. 1, 2022]. Retrieved from the Internet <https://www.ckgsb.edu.cn/uploads/professor/202008/14/Ma_Sun_2020.pdf>., Aug. 2020, 24 Pages.

Moniz, Nuno et al., "A review on web content popularity prediction: Issues and open challenges", Online Social Networks and Media, vol. 12 [retrieved Dec. 1, 2022]. Retrieved from the Internet <doi.org/10.1016/j.osnem.2019.05.002>., https://www.researchgate.net/profile/Nuno-Moniz/publication/333728102_A_Review_on_Web_Content_Popularity_Prediction_Issues_and_Open_Challenges/links/5d00ffb9a6fdccd13095860d/A-Review-on-Web-Content-Popularity-Prediction-Issues-and-Open-Challenges.pdf, Jun. 12, 2019, 57 Pages.

Obermeyer, Ziad , "Dissecting racial bias in an algorithm used to manage the health of populations", Science, vol. 366, No. 6464 [retrieved Dec. 1, 2022]. Retrieved from the Internet <https://www.snowdropsolution.com/pdf/Dissecting%20Racial%20Bias%20In%20An%20Algorithm%20Used%20To%20Manage%20The%20Health%20Of%20Populations.pdf>., Oct. 2019, 8 Pages.

Opreana, Alin et al., "A New Development in Online Marketing: Introducing Digital Inbound Marketing", Expert Journal of Marketing, vol. 3, No. 1 [retrieved Dec. 1, 2022]. Retrieved from the Internet <https://marketing.expertjournals.com/ark:/16759/EJM_305opreana29-34.pdf>, Aug. 10, 2015, 6 Pages.

Pearl, Judea , "Causality", Cambridge University Press, New York, NY [retrieved Dec. 7, 2022]. Retrieved from the Internet <https://doi.org/10.1017/CBO9780511803161>., Mar. 2000, 200 Pages.

Petrovic, Sasa et al., "RT to Win! Predicting Message Propagation in Twitter", In International Conference on Weblogs and Social Media (ICWSM) [retrieved Dec. 5, 2022]. Retrieved from the Internet <http://cs.wellesley.edu/~trails/retweetpapers/papers/RTToWin.pdf>., May 11, 2011, 4 pages.

Pinto, Henrique et al., "Using early view patterns to predict the popularity of youtube videos", WSDM '13: Proceedings of the sixth ACM international conference on Web search and data mining [retrieved Dec. 5, 2022]. Retrieved from the Internet <https://doi.org/10.1145/2433396.2433443>., https://www.researchgate.net/profile/Marcos-Goncalves-9/publication/266653405_Using_early_view_patterns_to_predict_the_popularity_of_YouTube_videos/links/54b7a2e30cf2bd04be33b2b3/Using-early-view-patterns-to-predict-the-popularity-of-YouTube-videos.pdf, Feb. 4, 2013, 10 Pages.

Proskurnia, Julia et al., "Predicting the Success of Online Petitions Leveraging Multidimensional Time-Series", WWW '17: Proceedings of the 26th International Conference on World Wide Web [retrieved Dec. 5, 2022]. Retrieved from the Internet <https://exascale.info/assets/pdf/www_2017_p755.pdf>., Apr. 3, 2017, 10 Pages.

Pryor, J.J. , "How Many Stories are Published on Medium Each Month?", Medium [online] [retrieved Dec. 5, 2022]. Retrieved from the Internet <https://medium.com/feedium/how-many-stories-are-published-on-medium-each-month-fe4abb5c2ac0>., Sep. 14, 2020, 10 Pages.

Pryzant, Reid et al., "Interpretable Neural Architectures for Attributing an Ad's Performance to its Writing Style", Proceedings of the 2018 EMNLP Workshop BlackboxNLP: Analyzing and Interpreting Neural Networks for NLP [retrieved Dec. 6, 2022]. Retrieved from the Internet <https://aclanthology.org/W18-5415.pdf>., Nov. 2018, 11 Pages.

Radford, Alec et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.

Robert, Rose et al., "Managing Content Marketing: The Real-World Guide for Creating Passionate Subscribers to Your Brand", Content Marketing Institute [retrieved Jan. 11, 2023]. Retrieved from the Internet <https://books.google.com/books/about/Managing_Content_Marketing.html?id=PiPgXwAACAAJ>., Aug. 29, 2011, 209 Page.

Rubin, Donald , "Causal Inference Using Potential Outcomes: Design, Modeling, Decisions", Journal of the American Statistical Association, American Statistical Association, vol. 100 [retrieved

(56) References Cited

OTHER PUBLICATIONS

Dec. 6, 2022]. Retrieved from the Internet <http://www.stat.unipg.it/stanghellini/rubinjasa2005.pdf>., Mar. 2005, 10 Pages.

Rubin, Donald, "Estimating causal effects of treatments in randomized and nonrandomized studies", Journal of Educational Psychology, vol. 66, No. 5 [retrieved Dec. 6, 2022]. Retrieved from the Internet <https://web.archive.org/web/20190224065551id_/http://pdfs.semanticscholar.org/5451/22e2990590524459ec9b59ccac6ce71e3b6a.pdf>., Oct. 1974, 14 Pages.

Runge, Jakob et al., "Escaping the curse of dimensionality in estimating multivariate transfer entropy", Physical Review Letters [retrieved Dec. 6, 2022]. Retrieved from the Internet <https://www.pik-potsdam.de/members/kurths/publikationen/2012/rungeprl108.pdf>., Jun. 2012, 5 Pages.

Shrikumar, Avanti, "Not Just a Black Box: Learning Important Features Through Propagating Activation Differences", Cornell University arXiv, arXiv.org [retrieved Dec. 6, 2022]. Retrieved from the Internet <https://arxiv.org/pdf/1605.01713.pdf>., Apr. 11, 2017, 6 Pages.

Srivastav, Nimish et al., "US Application as Filed", U.S. Appl. No. 18/140,543, filed Apr. 27, 2023, 53 pages.

Sundararajan, Mukund et al., "Axiomatic Attribution for Deep Networks", Proceedings of the 34th International Conference on Machine Learning [retrieved Dec. 6, 2022]. Retrieved from the Internet <https://mit6874.github.io/assets/misc/sundararajan.pdf>., Jun. 13, 2017, 11 pages.

Talebi, Hossein et al., "NIMA: Neural Image Assessment", Cornell University arXiv, arXiv.org [retrieved Dec. 6, 2022]. Retrieved from the Internet <https://arxiv.org/pdf/1709.05424.pdf>., Apr. 26, 2018, 15 Pages.

Tang, Xiangyun et al., "Fully Exploiting Cascade Graphs for Real-time Forwarding Prediction", AAAI Technical Track on Application Domains vol. 35 No. 1 [retrieved Dec. 6, 2022]. Retrieved from the Internet <https://ojs.aaai.org/index.php/AAAI/article/view/16137>., May 18, 2021, 9 Pages.

Tank, Alex et al., "Neural Granger Causality", Cornell University arXiv, arXiv.org [retrieved Dec. 6, 2022]. Retrieved from the Internet <https://arxiv.org/pdf/1802.05842.pdf>., Mar. 13, 2021, 14 Pages.

Tatar, Alexandru et al., "A survey on predicting the popularity of web content", Journal of Internet Services and Applications vol. 5, No. 1 [retrieved Dec. 6, 2022]. Retrieved from the Internet <https://jisajournal.springeropen.com/counter/pdf/10.1186/s13174-014-0008-y.pdf>., Mar. 2015, 20 Pages.

Tatar, Alexandru, "Predicting the popularity of online articles based on user comments", Proceedings of the International Conference on Web Intelligence, Mining and Semantics [retrieved Dec. 6, 2022]. Retrieved from the Internet <https://doi.org/10.1145/1988688.1988766>., May 25, 2011, 8 Pages.

Varian, Hal, "Causal inference in economics and marketing", Proceedings of the National Academy of Sciences of the United States of America [retrieved Dec. 6, 2022]. Retrieved from the Internet <https://cdsbasel.github.io/dataanalytics/assets/pdf/Varian2016.pdf>., May 25, 2016, 6 Pages.

Veitch, Victor et al., "Adapting text embeddings for causal inference", Cornell University arXiv, arXiv.org [retrieved Dec. 6, 2022]. Retrieved from the Internet <https://arxiv.org/pdf/1905.12741.pdf>., Jul. 25, 2020, 10 Pages.

Wager, Stefan et al., "High-dimensional regression adjustments in randomized experiments", Cornell University arXiv, arXiv.org [retrieved Dec. 6, 2022]. Retrieved from the Internet <https://arxiv.org/pdf/1607.06801.pdf>., Oct. 27, 2016, 23 Pages.

Wang, Jiahao et al., "Will You Ever Become Popular? Learning to Predict Virality of Dance Clips", ACM Transactions on Multimedia Computing, Communications, and Applications, vol. 18, No. 2 [retrieved Dec. 6, 2022]. Retrieved from the Internet <https://arxiv.org/pdf/2111.03819.pdf>., Feb. 16, 2022, 23 Pages.

Wang, Tan et al., "Causal attention for unbiased visual recognition", Cornell University arXiv, arXiv.org [retrieved Dec. 6, 2022]. Retrieved from the Internet <https://arxiv.org/pdf/2108.08782.pdf>., Aug. 19, 2021, 18 Pages.

Wood-Doughty, Zach et al., "Challenges of using text classifiers for causal inference", Cornell University arXiv, arXiv.org [retrieved Dec. 6, 2022]. Retrieved from the Internet <https://arxiv.org/pdf/1810.00956.pdf>., Oct. 1, 2018, 13 Pages.

Xie, Jiayi et al., "Micro-video Popularity Prediction via Multimodal Variational Information Bottleneck", IEEE Transactions on Multimedia [retrieved Dec. 13, 2022]. Retrieved from the Internet <https://ieeexplore.ieee.org/abstract/document/9576573>., Oct. 15, 2021, 14 Pages.

Yang, Yang et al., "A named entity topic model for news popularity prediction", Knowledge-Based Systems, vol. 208 [retrieved Dec. 13, 2022]. Retrieved from the Internet <https://www.sciencedirect.com/science/article/abs/pii/S0950705120305591>., Nov. 15, 2020, 12 Pages.

Zhou, Fan, "A survey of information cascade analysis: Models, predictions, and recent advances", ACM Comput. Surv., vol. 54, No. 2 [retrieved Dec. 6, 2022]. Retrieved from the Internet <https://researchain.net/archives/pdfreader/A-Survey-Of-Information-Cascade-Analysis-Models-Predictions-And-Recent-Advances-2229179>., Mar. 24, 2021, 43 Pages.

* cited by examiner

CONTENT ANALYTICS AS PART OF CONTENT CREATION

BACKGROUND

Content creation services are usable to create a wide range of content. In a first example, digital content is created for use in a variety of digital and online scenarios, such as a digital image, digital audio, digital media and so forth that are utilized to implement applications, webpages, etc. In a second example, physical content is used in physical environments "in the real world," such as banners, posters, physical documents, books, and so forth.

Conventional content creation services, while providing a multitude of tools usable to create the physical and digital content, do not provide insight or guidance into how to create the content for achieving a desired result. Consequently, conventional content creation services rely on a "best guess" of a content creator, which is inefficient and therefore results in increased power consumption and inefficient use of computational resources.

SUMMARY

Content creation techniques are described that leverage content analytics to provide insight and guidance as part of content creation. To do so, content features are extracted by a content analytics system from a plurality of content. The content features describe characteristics of the content, such as visual characteristics of images included as part of the content. The content features are then used by the content analytics system as a basis to generate a content dataset.

Event data is also collected by the content analytics system from an event data source and may be generated as part of online or offline events. Event data describes user interaction with respective items of content, including cross channel interactions involving web, mobile, application, email, and social media channels. Event data is also configurable to describe event interactions involving subsequent activities, e.g., purchases, sign ups, and so forth. The event data is also usable to show correlations for user segments as supporting analysis of specific sets of users. The event data is then used to generate an event dataset that also includes respective content identifiers of content that is a subject of the user interactions.

An analytics user interface is then generated by the content analytics system using the content dataset and the event dataset. The analytics user interface, for instance, includes representations of an item of content, representations of event data corresponding to the item of content, and representations of content features corresponding to the item of content. In another example, generative artificial intelligence (AI) techniques that leverage a machine-learning model are used to perform a search for similar content, create a new item of content based on the event data and the content data, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
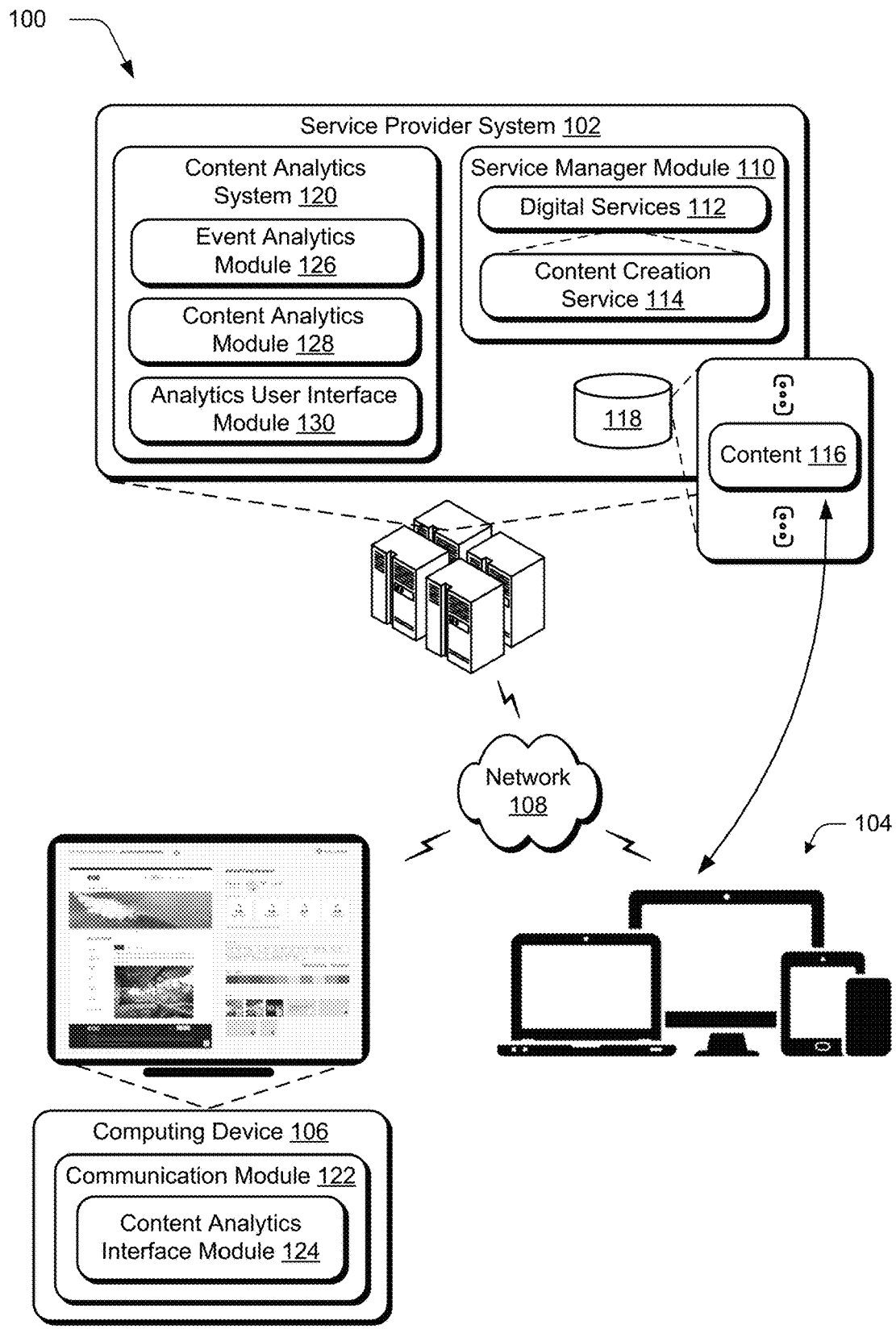
FIG. 1 is an illustration of a content creation and analytics environment in an example implementation that is operable to employ content creation techniques that leverage content analytics as described herein.

Conventional content creation services provide limited insight into how to create content to achieve a desired result. A creative professional, for instance, may be tasked with creating a book cover that is to be used both for a physical version of the book as well as a digital version. Although the conventional content creation services include a multitude of tools usable to create the book cover, conventional content creation services provide limited insight and guidance into how to create the book cover to achieve a desired result, e.g., draw interest of potential readers.

Accordingly, content creation techniques are described that leverage content analytics to provide insight and guidance as part of content creation. To do so in one example, content features are extracted by a content analytics system from a plurality of content. The content features describe characteristics of the content, such as visual characteristics of images included as part of the content. In a first instance, the content features are extracted by the content analytics system as part of generating the content, e.g., as part of translating a digital document having text and digital images in a markup language content such as a webpage. In a second instance, the content features are extracted by the content analytics system automatically and without user intervention, such as through use of a plurality of machine-learning models trained as classifiers to identify probabilities that respective items of content include a respective content feature.

The content features are then used by the content analytics system as a basis to generate a content dataset. The content dataset includes a content profile for each item of content. The content profile includes a respective content identifier (ID) and descriptions of the plurality of content features extracted from the respective item of content. The content features are then usable as part of a generative artificial intelligence (AI) that leverages a machine-learning model for content generation as further described below as part of content creation (automated) and/or guiding content creation.

Event data is also collected by the content analytics system from an event data source including an online data source and an offline data source. Event data describes user interaction with respective items of content. Examples of event data include "a number of clicks" (i.e., how many times a respective item of content is selected), "page views," purchases (e.g., online or in store which may be tied together via a user's account), and so forth. The event data is then used to generate an event dataset that also includes respective content identifiers of content that is a subject of the user interactions, e.g., which digital images or text resulted in a "click through" to a product description webpage.

An analytics user interface is then generated by the content analytics system using the content dataset and the event dataset. The analytics user interface, for instance, includes representations of an item of content, representations of event data corresponding to the item of content, and representations of content features corresponding to the item of content. For example, the analytics user interface is configurable to track content across both online and offline channels.

The event data, for instance, is displayed as a performance indicator associated with a respective content feature, e.g., a color pallet, emotion exhibited by a digital image, and so forth. The performance indicator is configurable to quantify user interaction with respective items of content having the content feature, e.g., "a warm color palette results in 3k page views for digital images in a webpage." In another example, performance indicator indicates offline conversion events. In this way, the content analytics system provides insight into content features that are included within an item of content towards achieving a desired action, e.g., achieving a "click through." This insight supports a variety of functionality.

In one example, the insights are used to guide content creation. A content creation service, for instance, exposes a user interface via which a content template is selected, e.g., to generate a webpage. The content template is then output in a user interface that includes a plurality of options configured to support edits to an item of content, e.g., draw lines, change digital images, edit text, and so forth. The user interface also includes representations of a plurality of content features and event data (e.g., performance indicators) corresponding to those features. As a result, the user interface provides insight into an effect of corresponding content features on achieving a desired action or result. The user interface is also configurable to indicate how content editing affects a particular user segment, e.g., particular audience.

Further, content analytics are usable to create similar assets through use of generative artificial intelligence (AI) that leverages machine-learning models usable to create or locate content based on the features and analytics. The user interface, for instance, is configurable to support functionality to select one or more characteristics of the content (e.g., content properties) and locate content having similar characteristics as part of a content search. In another example, those content features are usable as part of generative artificial intelligence (AI) implemented using machine-learning models to create new content that is similar in nature, e.g., text, digital images, digital audio, and so forth.

In an implementation, the user interface is also configured to update the event data responsive to edits made to content features of the content. A user input, for instance, is received to change a color palette of the webpage from a "warm summer color" to a "cool fall color." Representations of the color palette as a content feature are updated in the user interface along with an update to the performance indicator based on the edit. The update to the performance indicator, for instance, is made by querying event data for other content having the content feature, e.g., the "cool fall color" palette. In this way, the user interface provides insight in real time as edits are made to the content, thereby increasing a likelihood that the content is successful in achieving a desired result, e.g., a "click through," a threshold amount of view time, and so forth. As a result, the content analytics system improves user and computational efficiency in content creation and provides insight that is not possible using conventional content creation techniques. Further discussion of these and other examples is included in the following sections and shown in corresponding figures.

TERM EXAMPLES

"Content" includes digital content and physical content. In a first example, digital content includes a digital image, digital audio, digital media and so forth that are utilized to implement applications, webpages, etc. In a second example, physical content is used in physical environments "in the real world," such as banners, posters, physical documents, books, and so forth.

"Content features" involve features usable to describe content. Examples of content features of a digital image include color, emotion evoked, color palette used, keywords associated with the digital image, and so forth.

"Event data" describes events involving user interaction with content. In a digital medium scenario, examples of event data include dwell time, a number of clicks, page views, and so forth. In a physical scenario, examples of event data include a number of pamphlets taken.

"Performance indicators" are examples of event data. Performance indicators are configurable to quantify user interaction with respective items of content having the content feature, e.g., "a warm color palette results in 3k purchase/views for digital images in a webpage."

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a content creation and analytics environment 100 in an example implementation that is operable to employ content creation techniques that leverage content analytics as described herein. The illustrated environment 100 includes a service provider system 102, a plurality of client devices 104, and a computing device 106 that are communicatively coupled, one to another, via a network 108. Computing devices that implement the service provider system 102, the plurality of client devices 104, and the computing device 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in some instances in the following discussion, a computing device is also representative of a plurality of different devices, such as multiple servers utilized by a business to perform operations "over the cloud" as described in FIG. 22.

The service provider system 102 includes a service manager module 110 that represents functionality usable to implement and manage operation of digital services 112. Digital services 112 are accessible remotely over the network 108 by the client devices 104 and computing device, e.g., using a network-enabled application, plug-in module, browser, and so forth. The service provider system 102, as implementing a network platform, implements the digital services 112 through execution of software by respective servers or other hardware devices.

Digital services 112 are configurable to support a wide variety of functionality, including use of a content creation service 114 that is configured to manage creation and distribution of content 116, which is illustrated as digital content stored in a storage device 118. In a first example, digital services 112 support social networking that is used to share content 116 as digital images, videos, and status updates through corresponding profiles. In a second example, the digital services 112 support the content 116 as part of messaging and communication between corresponding client devices 104. In a third example, the digital services 112 support streaming of the content 116 to the client devices 104, e.g., streaming of digital audio, digital movies, and so forth.

The content creation service 114 is usable to create a wide range of content 116 as previously described. In a first example, the content 116 is configured as digital content for use in a variety of digital and online scenarios, such as a digital image, digital audio, digital media that are utilized to implement applications, webpages, and so forth. In a second example, the content 116 is used to generate physical content for use in physical environments "in the real world," such as banners, posters, physical documents, books, and so forth. Conventional content creation services, while providing a multitude of tools usable to create the content, do not provide insight or guidance into how to create the content for achieving a desired result. Consequently, conventional content creation services rely on a "best guess" of a content creator, which is inefficient and therefore results in increased power consumption and inefficient use of computational resources.

To address these technical challenges, a content analytics system 120 is implemented to provide insight into an effect of content features of the content 116 on achieving a desired outcome, e.g., action. A communication module 122 of the computing device 106, for instance, includes a content analytics interface module 124 that is configured to communicate with the content analytics system 120 and the content creation service 114 of the digital services 112 via the network 108. The content analytics interface module 124, for instance, outputs a user interface via interaction with the content creation service 114 to create content. The user interface is configured to guide creation of the content 116 using insights gained by the content analytics system 120 through monitored user interaction with content and content features of the content.

To do so, the content analytics system 120 includes an event analytics module 126, a content analytics module 128, and an analytics user interface module 130. The content analytics system 120, through the use of these modules, is configured to monitor user interaction with the content 116, derive content features from the content 116, and correlate the content features with the monitored user interaction to provide the insight.

The content analytics system 120, for instance, is configured to process the content 116 to determine content features, e.g., layout, image, text blocks, video assets, and so forth. The processing is performable as part of document translation in which a digital document (e.g., ".doc," spreadsheet, presentation, etc.) having text and digital images is translated into markup language content, e.g., as a hypertext markup language (HTML) content such as a webpage, electronic message, and so forth. As part of translation, content features are identified.

In an example, machine-learning models are used to identify the content features. The machine-learning models, for instance, are configurable as part of a content tagging service that support extraction of both generic features (e.g., smart tags, color tags, persuasion strategies, emotions) as well as user-defined features. The content features are then converted by the content analytics module 128 into content profiles as structured descriptive features that capture salient characteristics of respective items of content 116. A content identifier (ID) is associated with the content profile and the set of content features of a respective item of content. Individual content profiles may be aggregated to support an understanding of characteristics of a composite content experience, such as a webpage formed using multiple items of content to create a webpage content profile.

The event analytics module 126 is configured to generate event data that describes user interaction with individual items of content 116. The event analytics module 126, for instance, generates an event ID for a corresponding event, a content ID identifying a respective item of content that is a subject of the user interaction, and an event description that describes "what went on" as part of the event. The event data is then maintained by the event analytics module 126 as part of an event dataset.

The analytics user interface module 130 is then employed to generate an analytics user interface that unites the content 116, content features, and event data. The analytics user interface, for instance, may surface performance indicators associated with respective content features of items of content. In an example of a webpage, for instance, the performance indicators are usable to correlate characteristics of images (e.g., "inspirational," "informational," "screenshot") that are correlated with "clicks on links" to navigate to a product description page. The analytics user interface is also configurable to show a correlation between a reading level on a blog page and dwell time, a correlation between a persuasion strategy and a click-through rate in a particular tile view on a landing page, correspondence between content and offline events (e.g., using cross-channel and attribution features), and so forth.

The content analytics system 120 also supports an ability to track content 116 usage across channels (e.g., web, email, physical) and indicate respective performance through use of performance indications on other items of content included within the content 116 and content features. This functionality supports a variety of usage scenarios, including "what are the aggregate views (impressions)/dwell time/click rate/bounce rate on webpages the utilize a particular digital image for visitors from a particular geographic region." In another usage scenario, the functionality supports an ability to determine "what is the best performing webpage template in terms of dwell time" and "what items of content having an aggregate click-through rate below a threshold level for a performance indicator."

The analytics user interface module 130 also supports segment creation functionality to identify a set of users based on responses to a particular set of content features. The analytics user interface module 130, for instance, supports an ability to create a segment of "users that clicked on a webpage with hiking images." Other advanced content performance use cases are also supported as shown in the user interfaces of FIGS. 5-17, including content usage and performance across channels and across campaigns.

In another example, the event data and content features are used as prompts as part of generative artificial intelligence (AI) techniques that employ one or more machine-learning models to create an item of content. The item of content, for instance, may include text that has an increased likelihood of achieving an action. Digital image creation is also contemplated, including generation of raster and vector images using generative AI based on the event data and content features. Other examples include code generation (e.g., for operable elements as part of the content), digital music, digital video, and multimodal examples. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Content Analytics as part of Content Creation

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-17 in parallel with an example procedure 1800 of FIG. 18.

Figure 2:
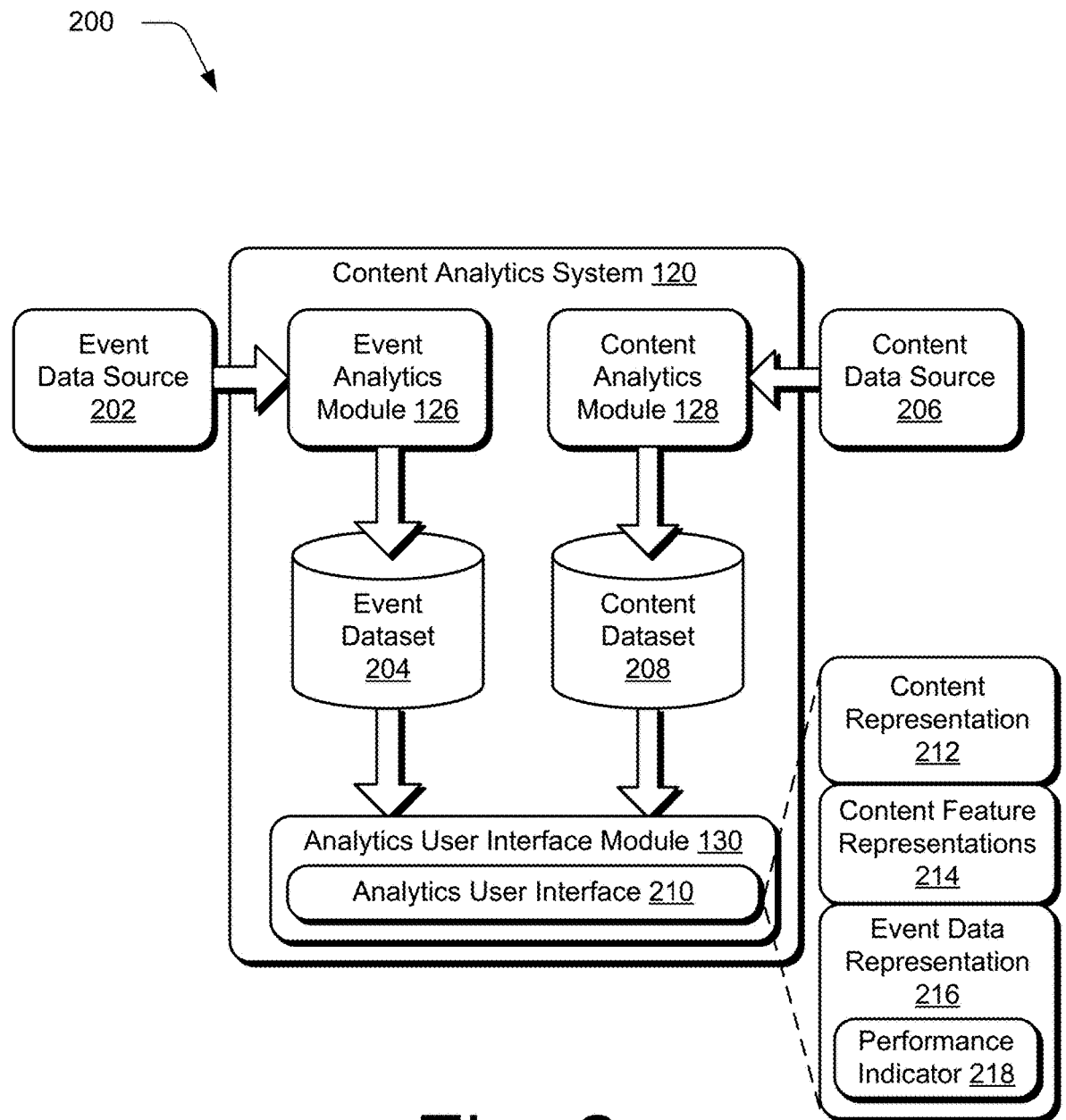
FIG. 2 depicts a system in an example implementation showing operation of a content analytics system of FIG. 1 in greater detail.

FIG. 2 depicts a system 200 in an example implementation showing operation of the content analytics system 120 of FIG. 1 in greater detail. As previously described, the content analytics system 120 utilizes an analytics user interface module 130 to unite event data that describes user interaction with content features extracted from the content 116. To do so, the content analytics system 120 employs an event analytics module 126 and a content analytics module 128.

The event analytics module 126, for instance, receives data from an event data source 202 and processes the data for storage as an event dataset 204. The event data source 202 therefore includes event data describing user interaction with respective items of content 116. Likewise, the content analytics module 128 receives data from a content data source 206 and processes the data as a content dataset 208.

The analytics user interface module 130 is communicatively coupled to the event dataset 204 and the content dataset 208 and uses data from these sources to generate an analytics user interface 210. The analytics user interface 210 includes a content representation 212 of a respective item of content, content feature representations 214 of content features extracted from the content 116 and stored as part of the content dataset 208, an event data representation 216 of event data associated with the content 116, e.g., as the item of content 116 as a whole, as corresponding to individual content features, and so forth.

An example of an event data representation 216 is a performance indicator 218. A performance indicator 218 is a type of performance measurement quantifying occurrence of an event towards achieving an outcome. Performance indicators 218 are configurable as quantitative performance indicators that have a specific numerical value measured using a standard, e.g., number of clicks, dwell time, and so forth. Quantitative performance indicators, for instance, employ four parts as defining an activity, an input, an output, a control, and a mechanism. The input defines "what goes into" the activity, the activity is then used to transform the input, which produces an output. The control is a mechanism used to control the activity's production.

Performance indicators 218 are also configurable as qualitative performance indicators representing non-numeric conformance with respect to a particular criterion. Qualitative performance indicators, for instance, are usable to quantify a user's option toward a particular item of content 116, e.g., "looks good." A variety of other examples are also contemplated.

Figure 3:
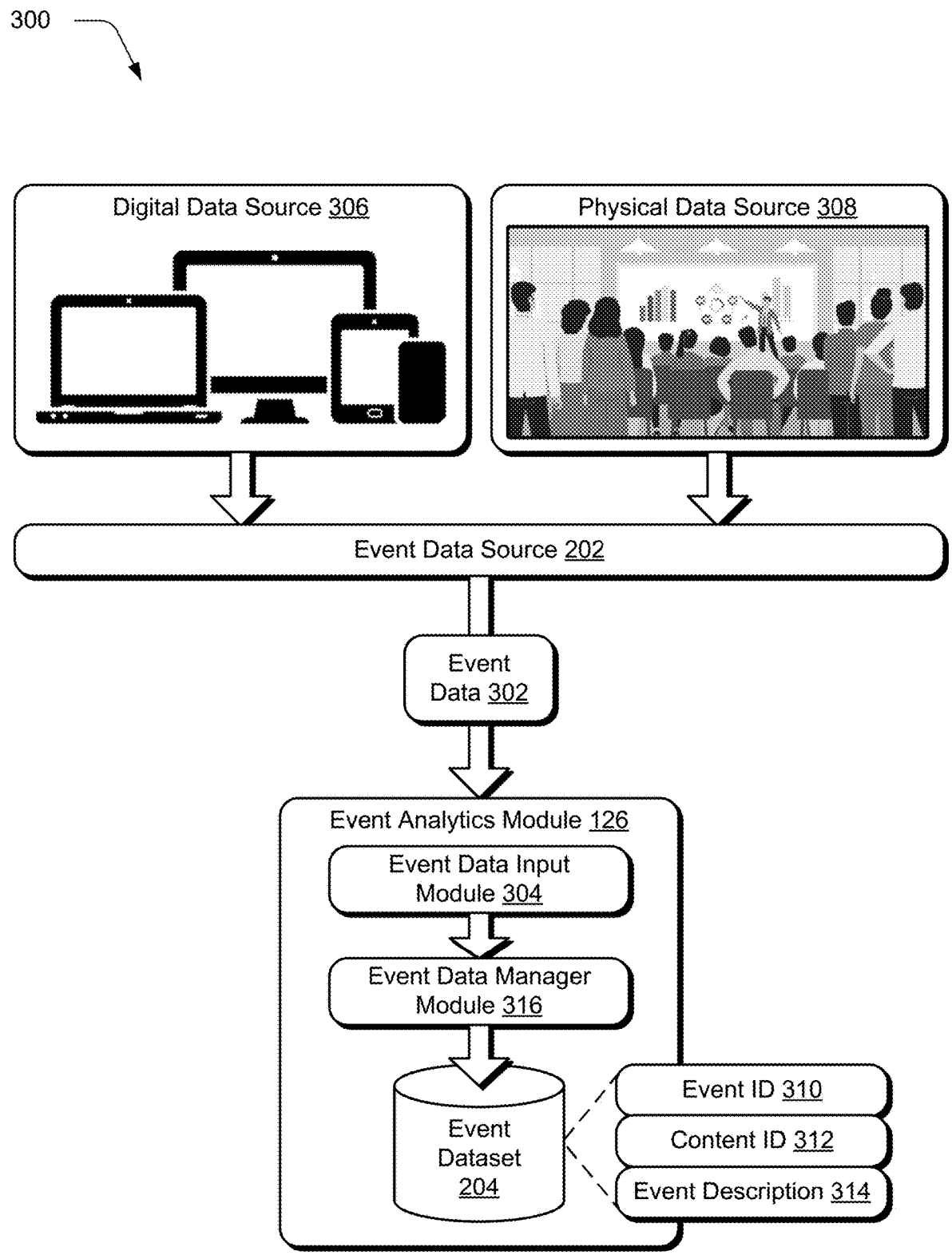
FIG. 3 depicts a system in an example implementation showing operation of the event analytics module of FIG. 2 in greater detail.

FIG. 3 depicts a system 300 in an example implementation showing operation of the event analytics module 126 of FIG. 2 in greater detail. In this example, event data 302 is collected by an event data input module 304 from an event data source 202. The event data 302 describes user interaction with respective items of content of a plurality of content (block 1802). The event data 302 is collectable from a wide range of event data sources 202, illustrated examples of which include a digital data source 306 and a physical data source 308.

The event data input module 304, for instance, may be used to collect event data 302 as "clickstream data" from a digital data source 306. Clickstream data may be obtained, for instance, through use of embedded modules (e.g., "smart pixels") that are embedded as part of content 116. The embedded modules generate the clickstream data as describing user interaction with the content 116, such as mobile applications, webpages, social media sites, blogs, and so forth. Thus, clickstream data describes a series of user interactions over time with content 116, which may occur over a single source of content (e.g., website) or linked to multiple sources. In one example, the clickstream data references websites visited, individual pages of the websites, how long and/or when the visits occurred, an order of the visits, newsgroups and emails set, and so forth that may occur both in relation to the digital services of the service provider system 102 and "outside" the digital services as occurring with other service provider systems.

Event data 302 is also collectable by the event data input module 304 from a physical data source 308. As previously described, content 116 may also take a variety of physical forms, such as physical books, posters, banners, pamphlets, flyers, and so forth involved in an industry conference. Event data 302 is therefore collectable that describes user interaction with the physical content, e.g., a number of flyers taken by attendees of the conference.

An event dataset 204 is then generated by an event data manager module 316 from the event data 302. The event dataset 302 includes respective content identifiers and descriptions of the user interaction (block 1804). The event data 302, for instance, is configured to include an event ID 310 that uniquely identifies the event, i.e., a particular instance of the user interaction with the content 116. The event data 302 is also configured to include a content ID 312 that uniquely identifies the content, itself. The event data 302 also includes an event description 314 that describes an action that occurred that is a subject of the event, e.g., "clicked a digital image," "select a link," "viewed for five seconds," and so forth. A variety of other examples are also contemplated.

Figure 4:
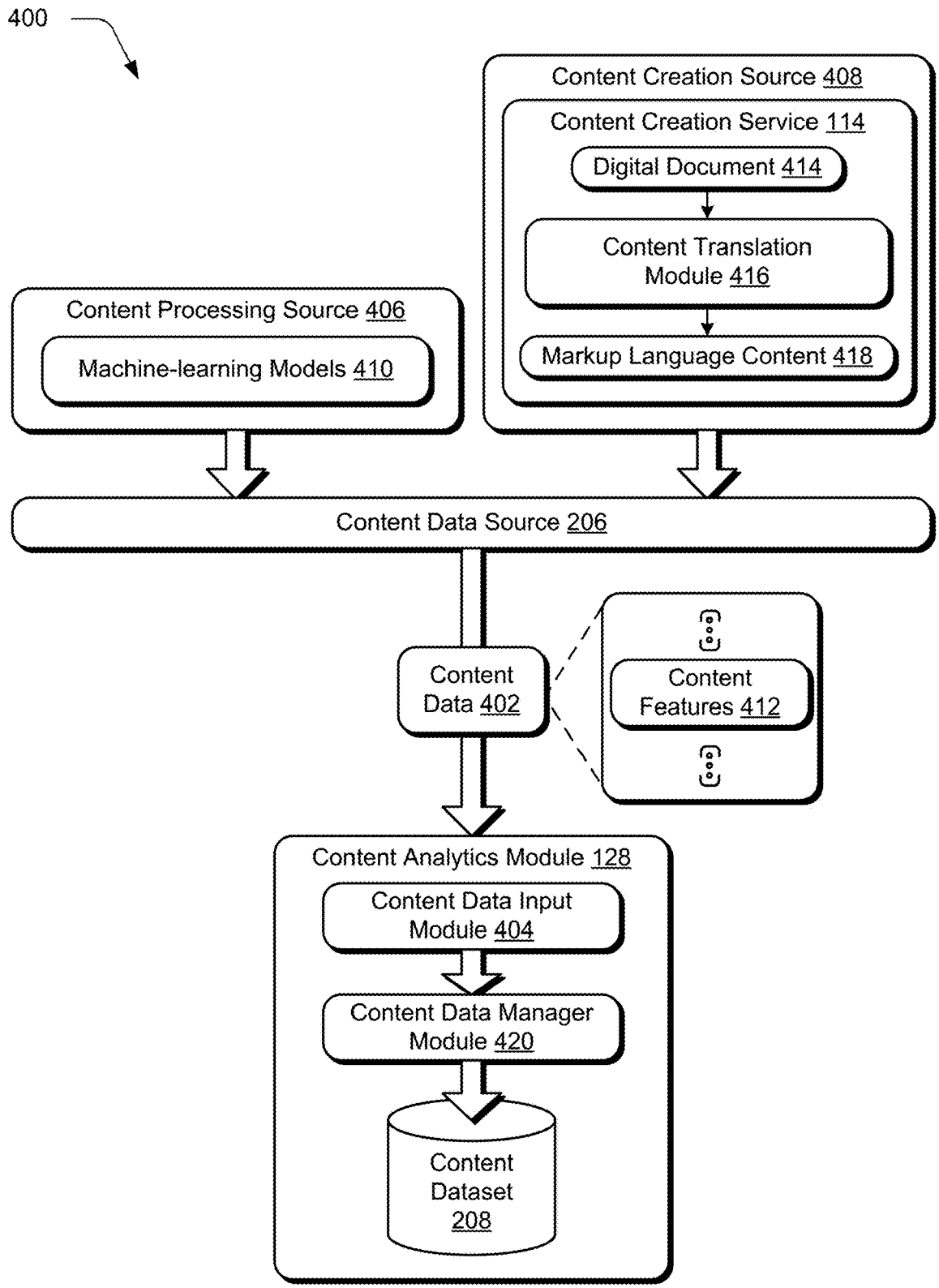
FIG. 4 depicts a system in an example implementation showing operation of a content analytics module of FIG. 2 in greater detail.

FIG. 4 depicts a system 400 in an example implementation showing operation of the content analytics module 128 of FIG. 2 in greater detail. In this example, content data 402 is collected by a content data input module 404 from a content data source 206. Examples of content data sources 206 include a content processing source 406 and a content creation source 408.

A content processing source 406, for instance, include a plurality of machine-learning models 410 that are configured to extract a plurality of content features 412, respectively, from a plurality of content (block 1806). The plurality of content features 412, for instance, describe characteristics of a respective item of content. In an example of digital images, for instance, the visual characteristics of the digital image, e.g., color palette, objects included in the digital image, and so forth.

The machine-learning models 410, which are trained and retrained as classifiers, are configured to output that an input does or does not include a corresponding content feature, e.g., a particular color palette, evokes "sad" emotions or other semantic concepts, and so forth. The plurality of machine-learning models 410, for instance, refer to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

In another example, the content creation source 408 leverages functionality of the content creation service 114 to generate content features 412 as part of creating content 116. The content features 412, for instance, are configurable as metadata describing "what" is included in a respective item of content 116 through monitored interaction during the creation of the content 116.

In another instance, the content creation service 114 is configured to leverage an automated translation service to generate the content features 412. The content creation service 114, for instance, is configured to receive a digital document 414 having text, digital images, and/or other content as generated by a creative professional. The digital document 414 is configurable in a variety of ways, such as a presentation, a word-processing document, a spreadsheet, and so on. A content translation module 416 is then configured to generate markup language content 418 from the digital document 414, automatically and without user intervention. The markup language content 418, for instance, is formed as a hypertext markup language (HTML), extensible markup language (XML), and so forth for use as a webpage. The content features 412 are thus formed by leveraging a structure of the markup language content 418, e.g., based on tags and other structures that are used to define "what" is included in the content 116.

The content features 412 of the content data 402 are then used by a content data manager module 420 to generate a content dataset 208. The content dataset 208 includes a plurality of content profiles having respective content identifiers and descriptions of the plurality of content features 412 extracted from the plurality of content 116 (block 1808). Each of the content profiles, for instance, includes a respective content ID that uniquely identifies the content 116, which may be the same as the content ID used by event dataset 204. The content profiles also include content features extracted from a respective item of content 116. In this way, the content features 412 of the content 116 may be correlated with event data describing user interaction with the content and/or content features, an example of which is described in the following description.

Figure 5:
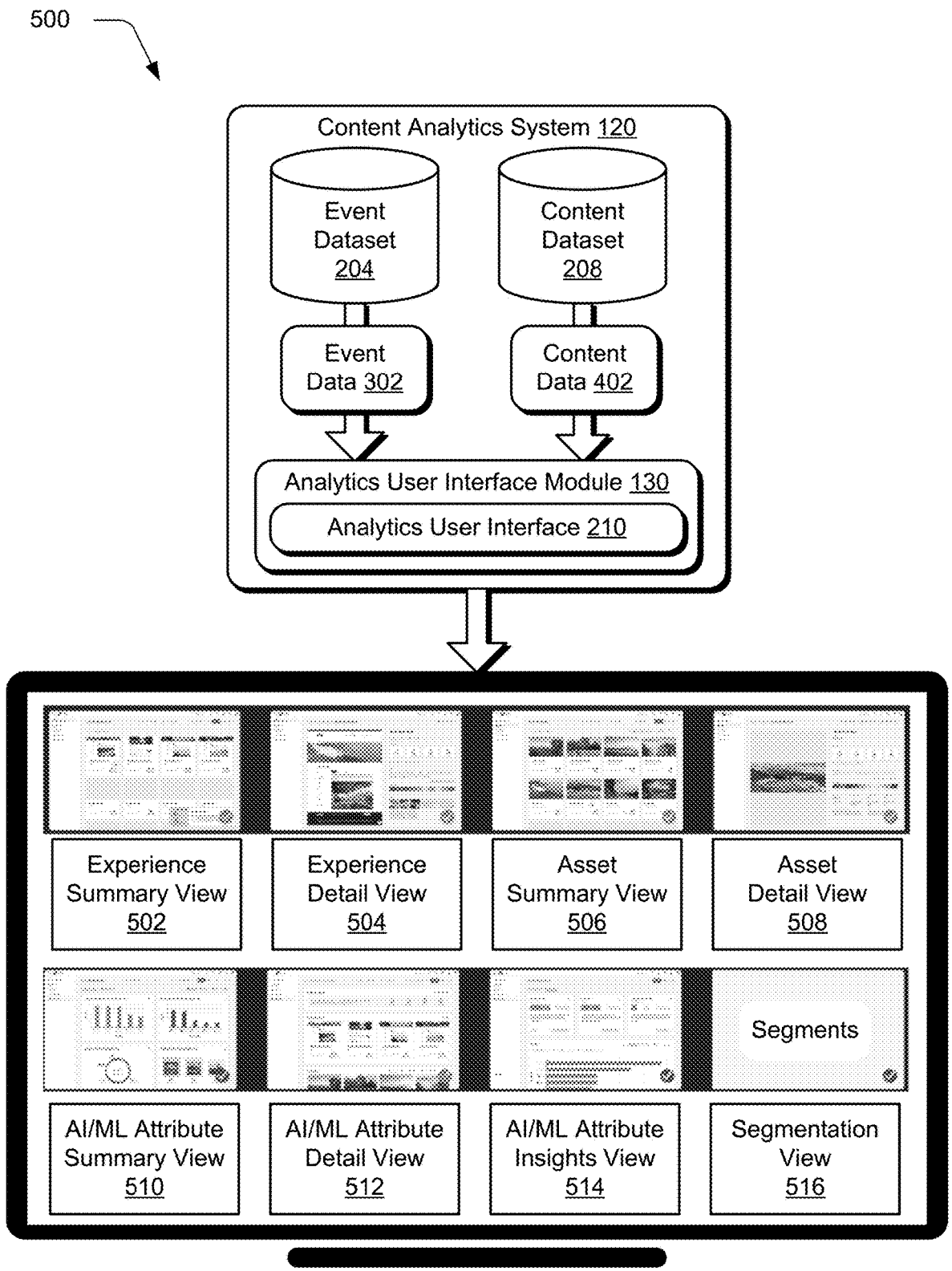
FIG. 5 depicts a system in an example implementation showing operation of an analytics user interface module of FIG. 2 as leveraging an event dataset as generated in FIG. 3 and a content dataset as generated in FIG. 4.

FIG. 5 depicts a system 500 in an example implementation showing operation of the analytics user interface module 130 of FIG. 2 as leveraging an event dataset 204 as generated in FIG. 3 and a content dataset 208 as generated in FIG. 4. In the illustrated example, an analytics user interface 210 includes an overview that is selectable to access different insights generated based on a correlation of the event data 302 with the content data 402.

Examples of representations of summary views accessible via the overview include an experience summary view 502, an experience detail view 504, an asset summary view 506, an asset detail view 508, an AI/ML attribute summary view 510, an AI/ML attribute detail view 512, an AI/ML attribute insights view 514, and a segmentation view 516. Each of these representations are selectable via the analytics user interface 210 to access a corresponding view.

Figure 6:
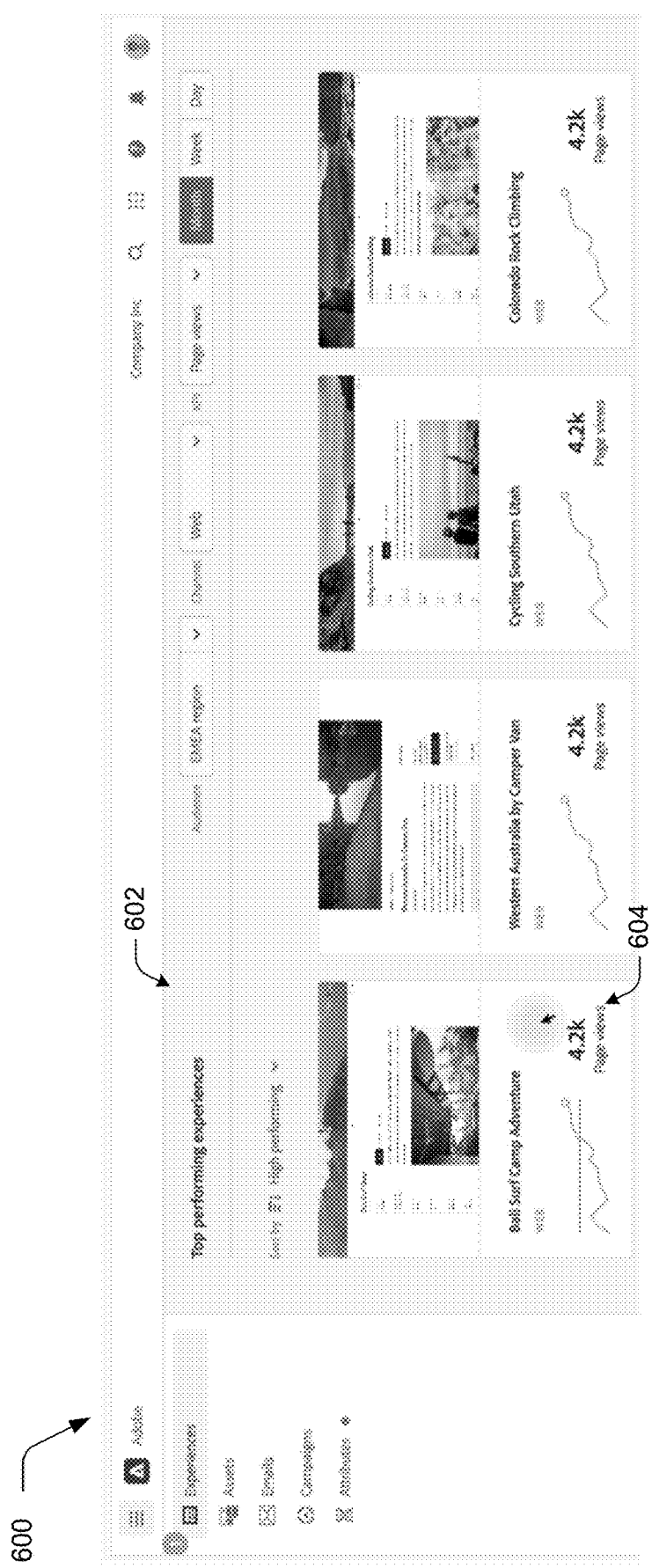
FIG. 6 depicts an example implementation of a user interface depicting top performing experiences generated based on the event dataset and the content dataset.

FIG. 6 depicts an example implementation of a user interface 600 depicting top performing experiences 602 generated based on the event dataset 204 and the content dataset 208. The user interface 600 is displayed as including representations of the plurality of content (block 1810). Examples of representations of the content include text indicating "Bali Surf Camp Adventure," "Western Australia by Camper Van," "Cycling Southern Utah," and "Colorado Rock Climbing" and digital images taken from a respective experience. Representations of event data are also displayed along with the experience which include performance indicators for the experience as a whole, e.g., as a number of page views and a graphical depiction of a page view trend.

An input 604 is received via the user interface 600 as selecting an item of content from the plurality of content (block 1812), e.g., "Bali Surf Camp Adventure." Selection of the representation of the item of content causes the analytics user interface module 130 to generate a user interface providing additional information regarding content features and event data corresponding to the item of content.

Figure 7:
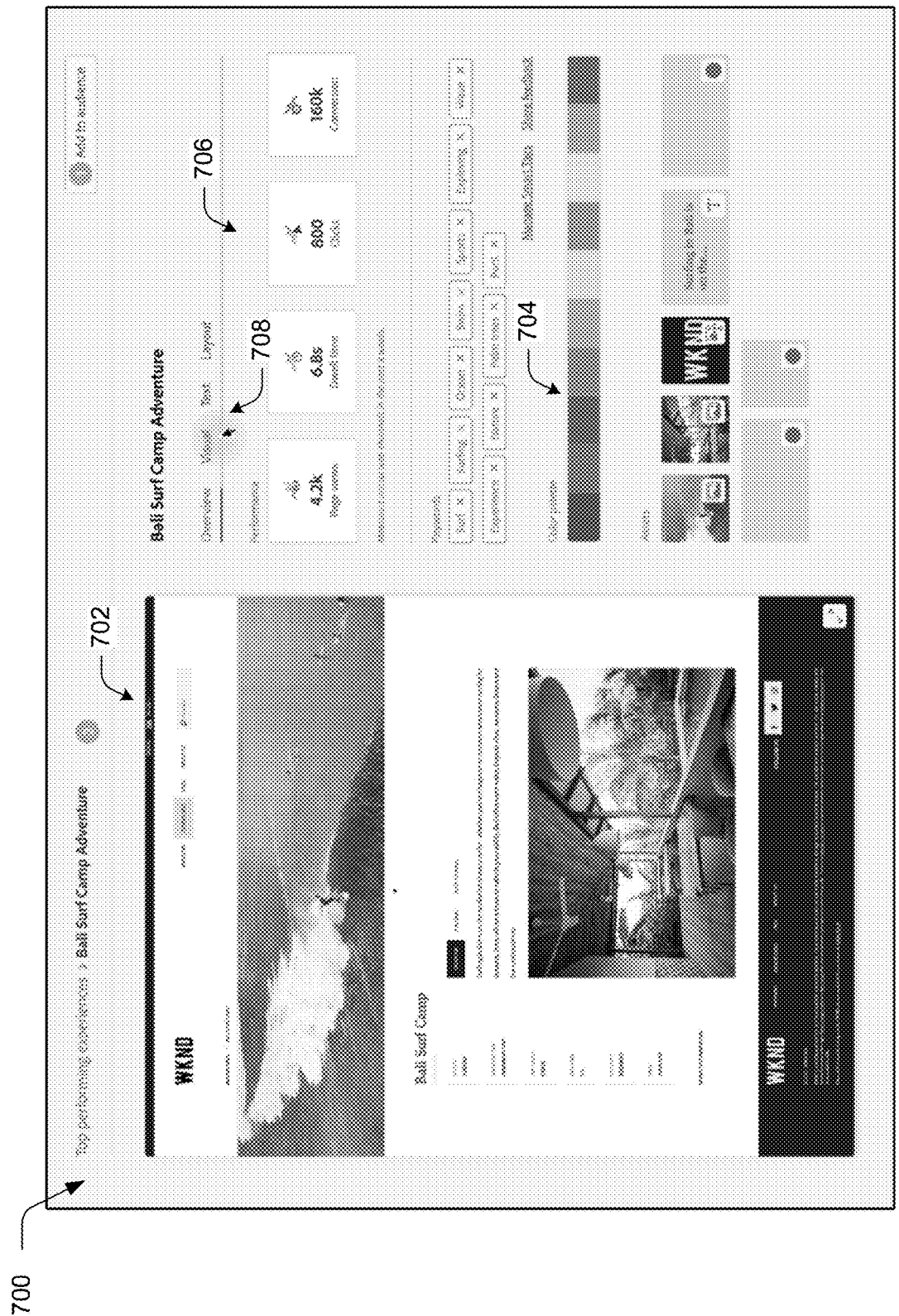
FIG. 7 depicts an example implementation of a user interface depicting content features and event data corresponding to an item of content selected in FIG. 6.

FIG. 7 depicts an example implementation of a user interface 700 depicting content features and event data corresponding to an item of content selected in FIG. 6. In response to the input of FIG. 6, event data 302 is located from the event dataset 204 and a respective content profile is located from the content dataset 208 based on a respective content identifier of the selected item of content (block 1814) by the analytics user interface module 130. The user interface 700 is then generated by the analytics user interface module 130 and displayed that includes a representation 702 of the selected item of content, a representation 704 of respective content features from the located content profile, and representations 706 of the located event data (block 1816).

The representation 702 of the selected item of content, for instance, depicts a webpage. Representations 704 of the respective content features includes a color palette used by the content. Examples of representations 706 of the located event data include performance indicators including a number of page views, an amount of dwell time, a number of clicks, and a number of conversions. Additional content features include keywords used to "tag" the content. An input 708 is received that selects a "visual" option in the user interface 700, which is usable to cause the analytics user interface module 130 to surface additional information regarding visual aspects and event data of the visual aspects for the content.

Figure 8:
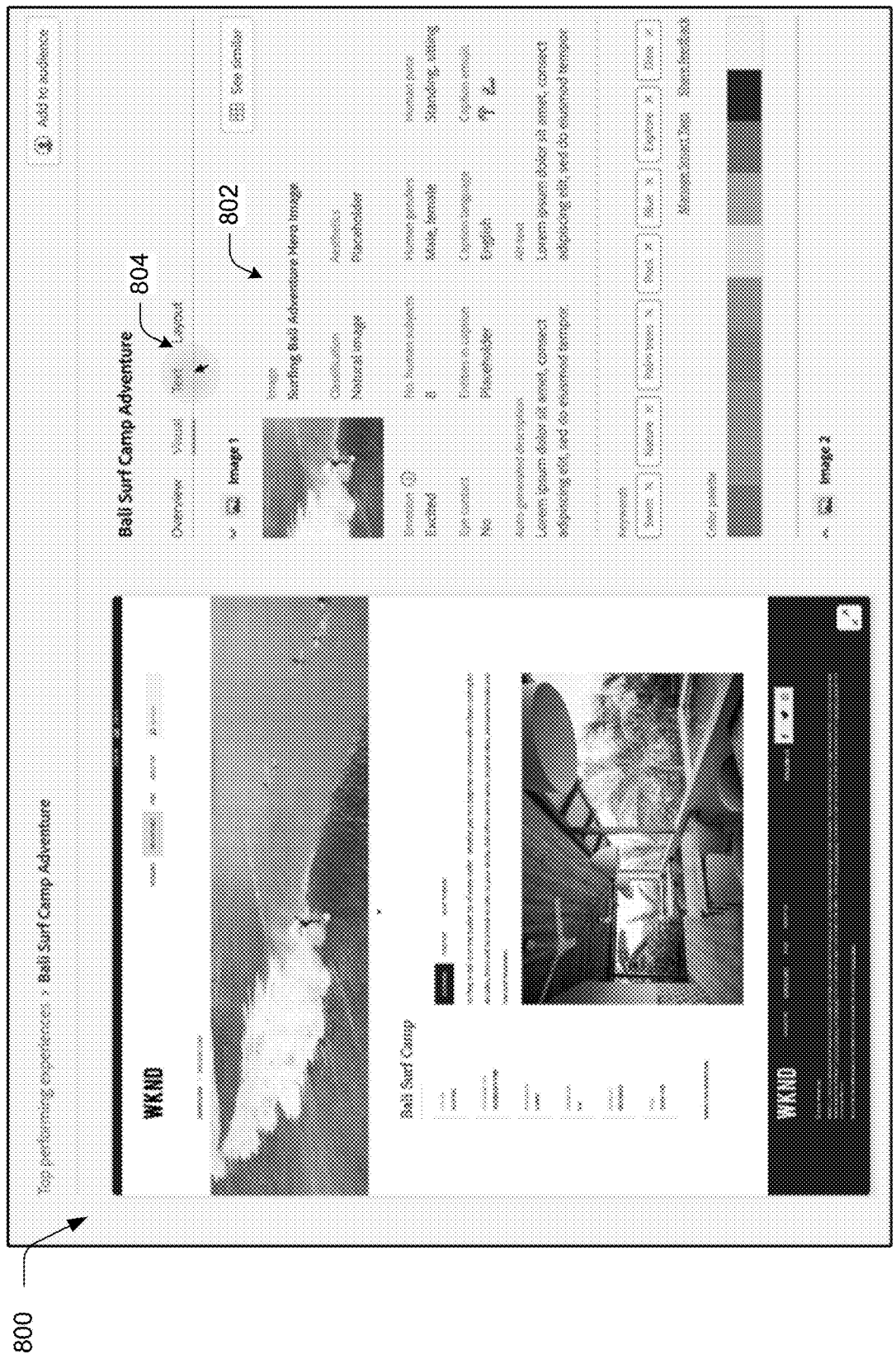
FIG. 8 depicts an example implementation of a user interface depicting visual content features corresponding to selection of a visual option via an input of FIG. 7.

FIG. 8 depicts an example implementation of a user interface 800 depicting visual content features 802 corresponding to selection of a visual option via an input of FIG. 7. Selection of the visual option causes output in this example of content features corresponding to visual aspects of an image included as part of the content. The content features include a name of the image, classification, aesthetics, emotion invoked, number of human subjects, human genders, human pose, whether eye contact is exhibited, existence of entities in a caption, caption language, and caption emojis.

A color palette is also depicted, along with an auto-generated description of the image, e.g., using generative artificial intelligence implemented by leveraging one or more machine-learning models. An input 804 is received that selects a "text" option in the user interface 800, which is usable to cause the analytics user interface module 130 to surface additional information regarding content features and event data of text included as part of the content.

Figure 9:
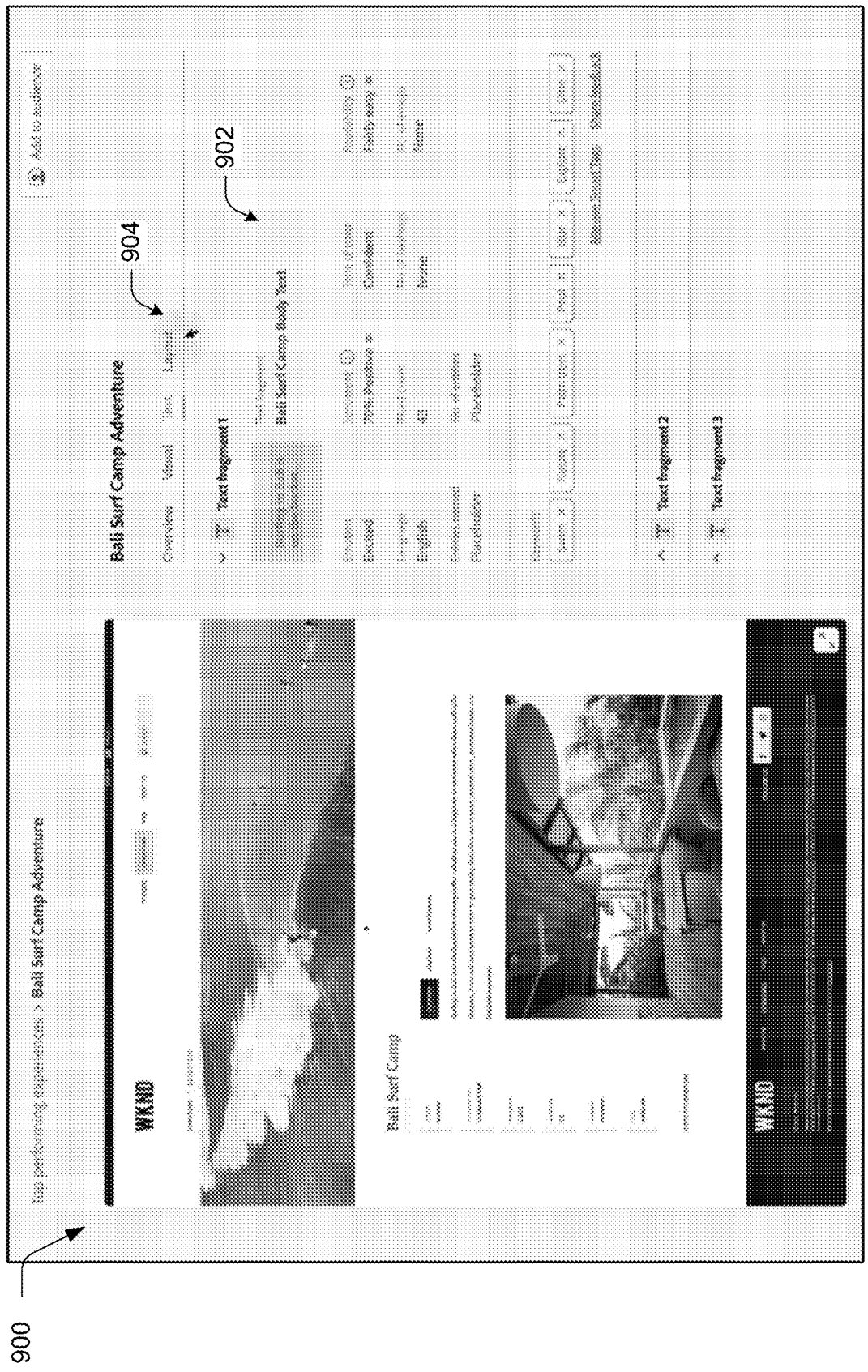
FIG. 9 depicts an example implementation of a user interface depicting text content features corresponding to selection of a text option via an input of FIG. 8.

FIG. 9 depicts an example implementation of a user interface 900 depicting text content features 902 corresponding to selection of a text option via an input of FIG. 8. The text content features 902 include identification of a text fragment, emotion invoked, sentiment (and corresponding performance indicator), tone of voice, readability, language, word count, number of hashtags, number of emojis, entities named, and number of entities. An input 904 is received that selects a "layout" option in the user interface 900, which is usable to cause the analytics user interface module 130 to surface additional information regarding content features and event data of a layout of the content.

Figure 10:
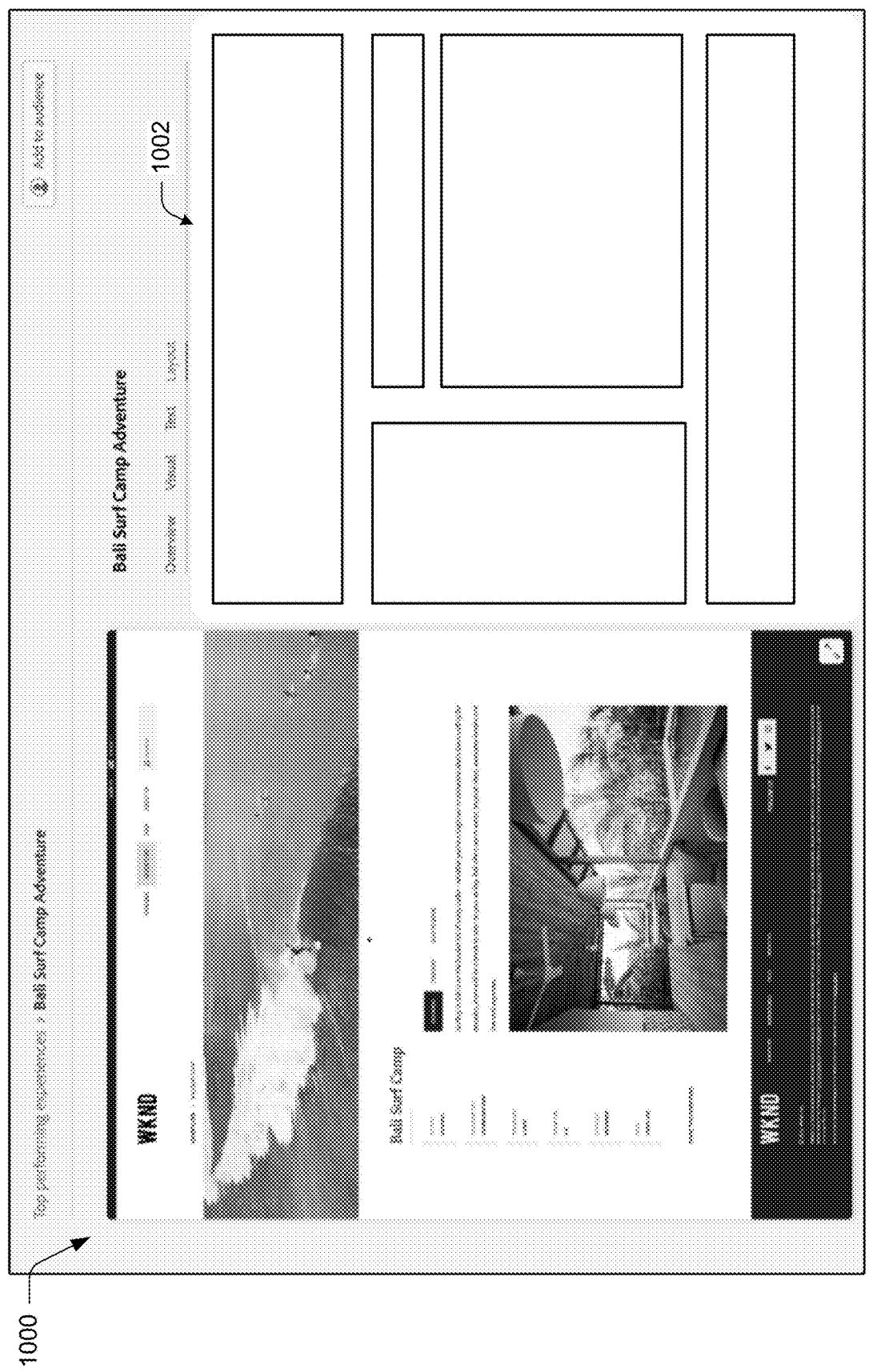
FIG. 10 depicts an example implementation of a user interface depicting layout content features corresponding to selection of a layout option via an input of FIG. 9.

FIG. 10 depicts an example implementation of a user interface 1000 depicting layout content features 1002 corresponding to selection of a layout option via an input of FIG. 9. The layout content features 1002 in this example depict a layout of an underlying template used to form the content, with placeholders for text and digital images to be used as part of creating the content, e.g., a webpage.

Figure 11:
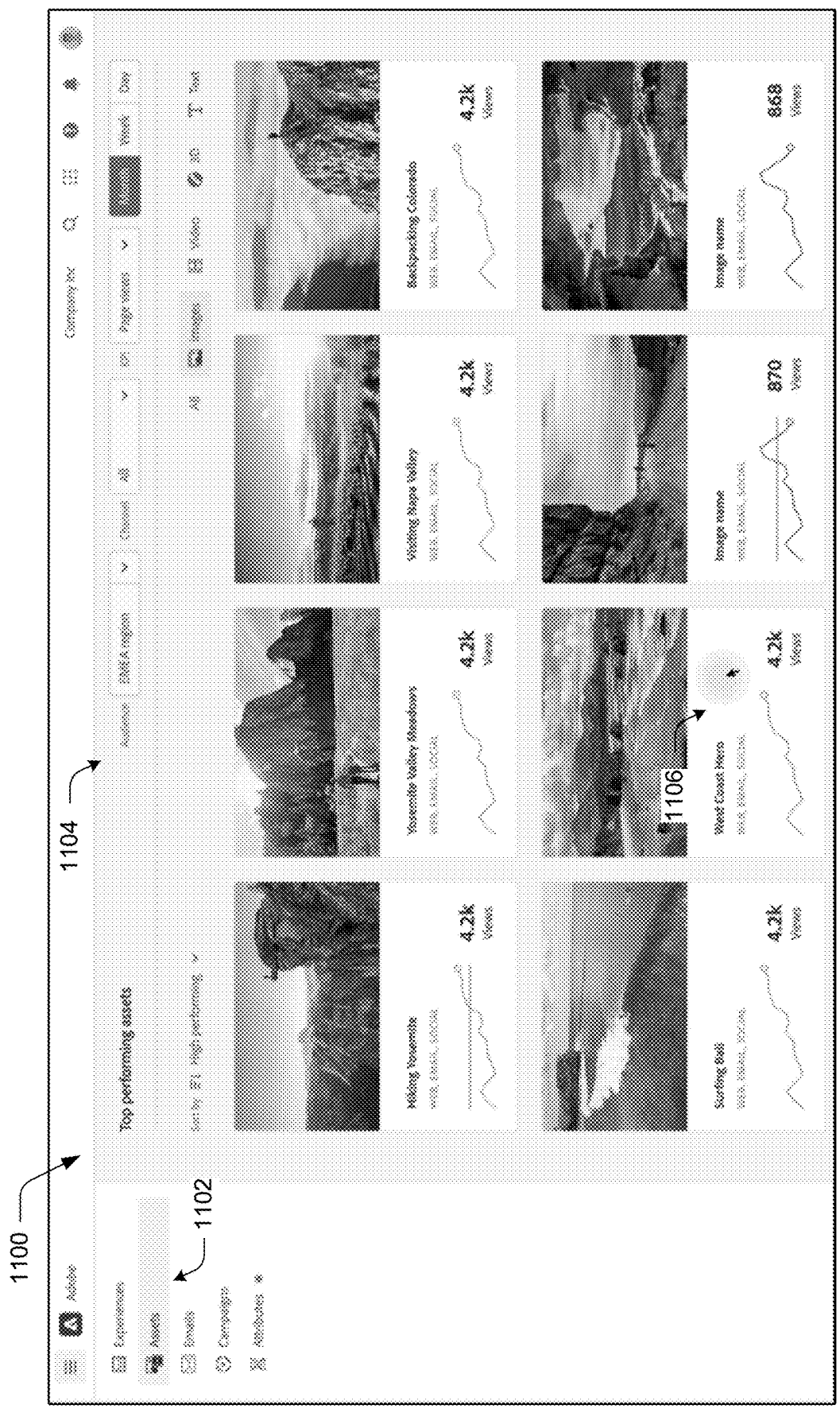
FIG. 11 depicts an example implementation of a user interface depicting an asset view of items of content including representations of the content and event data corresponding to the content.

FIG. 11 depicts an example implementation of a user interface 1100 depicting an asset view 1102 of items of content including representations of the content and event data corresponding to the content. The asset view 1102 includes search functionality 1104 that is usable to input a particular audience (e.g., geographic region), channel via which the content is delivered (e.g., email, webpage, social media), a performance indicator, and a timeframe. In the illustrated example, the performance indicator is a number of page views, channels include web, email, and social, and the content type is images. In response, the analytics user interface module 130 generates the user interface 1100 to include content that is the highest performing for that performance indicator in a corresponding timeframe. An input 1106 is received that selects a representation of a particular item of content in the user interface 1100, which is usable to cause the analytics user interface module 130 to surface additional information regarding content features and event data of particular item of content as previously described.

Figure 12:
FIG. 12 depicts an example implementation of a user interface depicting content features corresponding to selection of a representation of a particular item of content via an input of FIG. 11.

FIG. 12 depicts an example implementation of a user interface 1200 depicting content features corresponding to selection of a representation of a particular item of content via an input of FIG. 11. The content features 1202, as before, include a name of the image, classification, aesthetics, emotion invoked, number of human subjects, human genders, human pose, whether eye contact is exhibited, existence of entities in a caption, caption language, and caption emojis. A color palette is also depicted, along with an auto-generated description of the image, e.g., using generative artificial intelligence implemented by leveraging one or more machine-learning models.

Figure 13:
FIG. 13 depicts an example implementation of a user interface depicting event data involving performance trends for content features corresponding to selection of an option to display attributes.

FIG. 13 depicts an example implementation of a user interface 1300 depicting event data involving performance trends for content features corresponding to selection of an option 1302 to display attributes. The performance trends in this example are derived from event data for corresponding content features.

In a first example, a performance trend for "keywords with the most page views" is shown that describes keywords and corresponding numbers of page views as determined from event data. In a second example, a performance trend for "color palettes with the most page views" is illustrated that describes color palettes (e.g., cool, warm, neutral, fall, spring) and a corresponding number of page views. In a third example, "emotions with the most page views" are shown in proportion to each other. A variety of other examples are also contemplated, e.g., a "reading level with the most page views."

Figure 14:
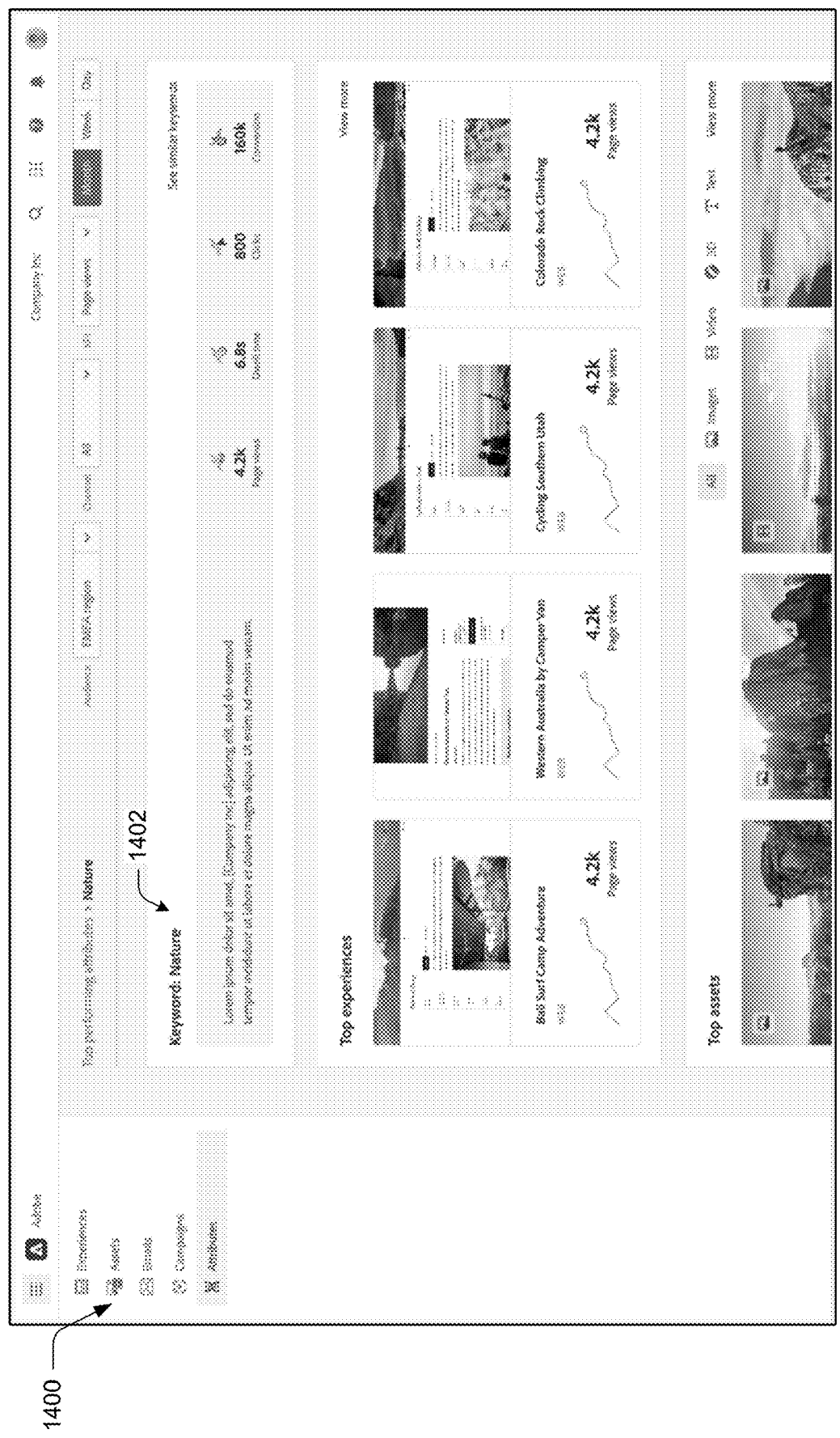
FIG. 14 depicts an example implementation of a user interface depicting event data for content features corresponding to selection of an option to display event data relating to keywords.

FIG. 14 depicts an example implementation of a user interface 1400 depicting event data for content features corresponding to selection of an option 1402 to display event data relating to keywords. In this example, a keyword "nature" is input as a content feature and corresponding event data is shown for content corresponding to the keyword, e.g., as a number of page views. Event data corresponding to the keyword, itself, is also depicted, including a number of page views, dwell time, clicks, and number of conversions.

Figure 15:
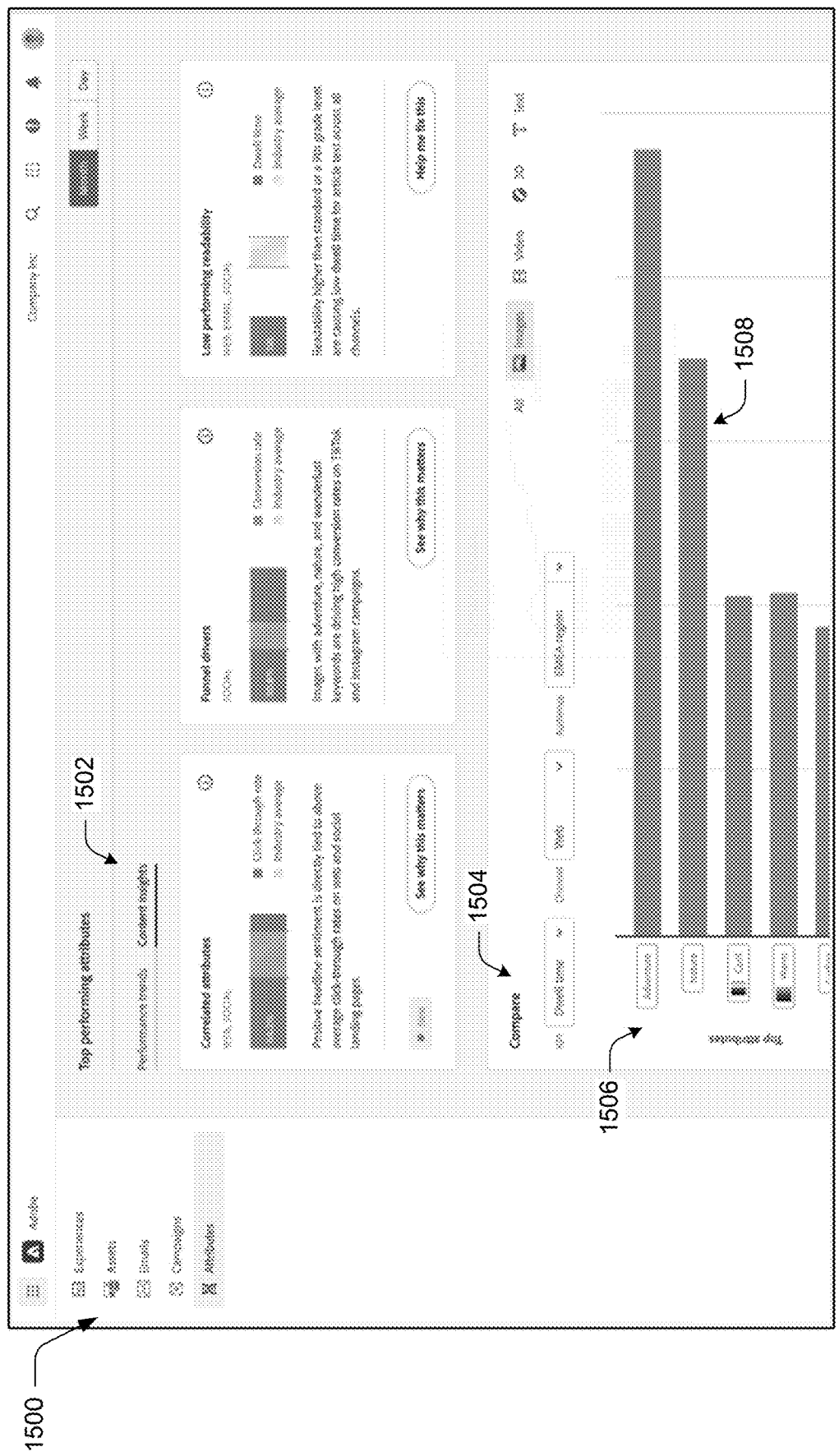
FIG. 15 depicts an example implementation of a user interface depicting event data responsive to selection of an option to output content insights for content features.

FIG. 15 depicts an example implementation of a user interface 1500 depicting event data responsive to selection of an option 1502 to output content insights for content features. The content insights in this example are derived from event data for corresponding content features. Examples of the content insights include correlated attributes, which indicates that positive headline sentiment is directly tied to above average click-through rates on web and social landing pages. This content insight includes a representation comparing a click-through rate and an industry average. Likewise, "funnel drives" are shown an indicate that images with adventure, nature, and wanderlust keywords drive high conversion rates on social media and also contrast a conversion rate with an industry average. Another content insight indicates that a readability level higher than standard or a $9^{th}$ grade level causes low dwell time for article text.

Comparison 1504 functionality is also supported in the user interface 1500 that includes input options to specify a performance indicator, channel, and audience. Attributes 1506 (i.e., content features) resulting from a search based on this search criteria are then output, i.e., as representations of corresponding content features such as keywords (e.g., adventure, nature), color palettes (e.g., warm, cool), and so forth. An input 1508 is received as selecting a representation of a content feature, which is usable to surface additional information including event data about the content feature by the analytics user interface module 130.

Figure 16:
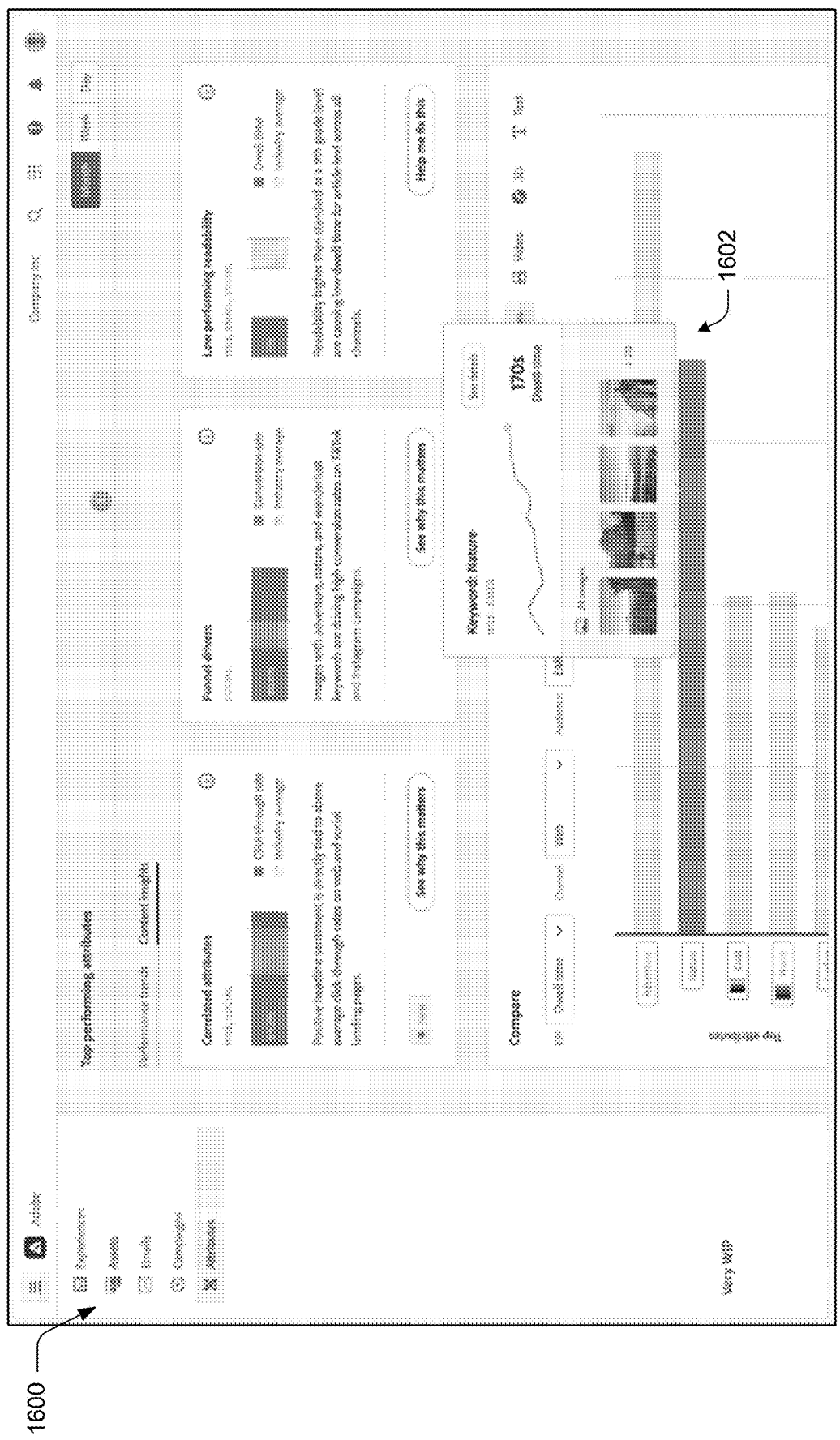
FIG. 16 depicts an example implementation of a user interface depicting event data responsive to selection of a representation of a content feature of FIG. 15.

FIG. 16 depicts an example implementation of a user interface 1600 depicting event data responsive to selection of a representation of a content feature of FIG. 15. Selection of the representation 1602 of a content feature "Keyword: Nature," for instance causes the analytics user interface module 130 to obtain event data corresponding to this content feature, e.g., as a dwell time and a graphic of a trend exhibited by the dwell time.

Figure 17:
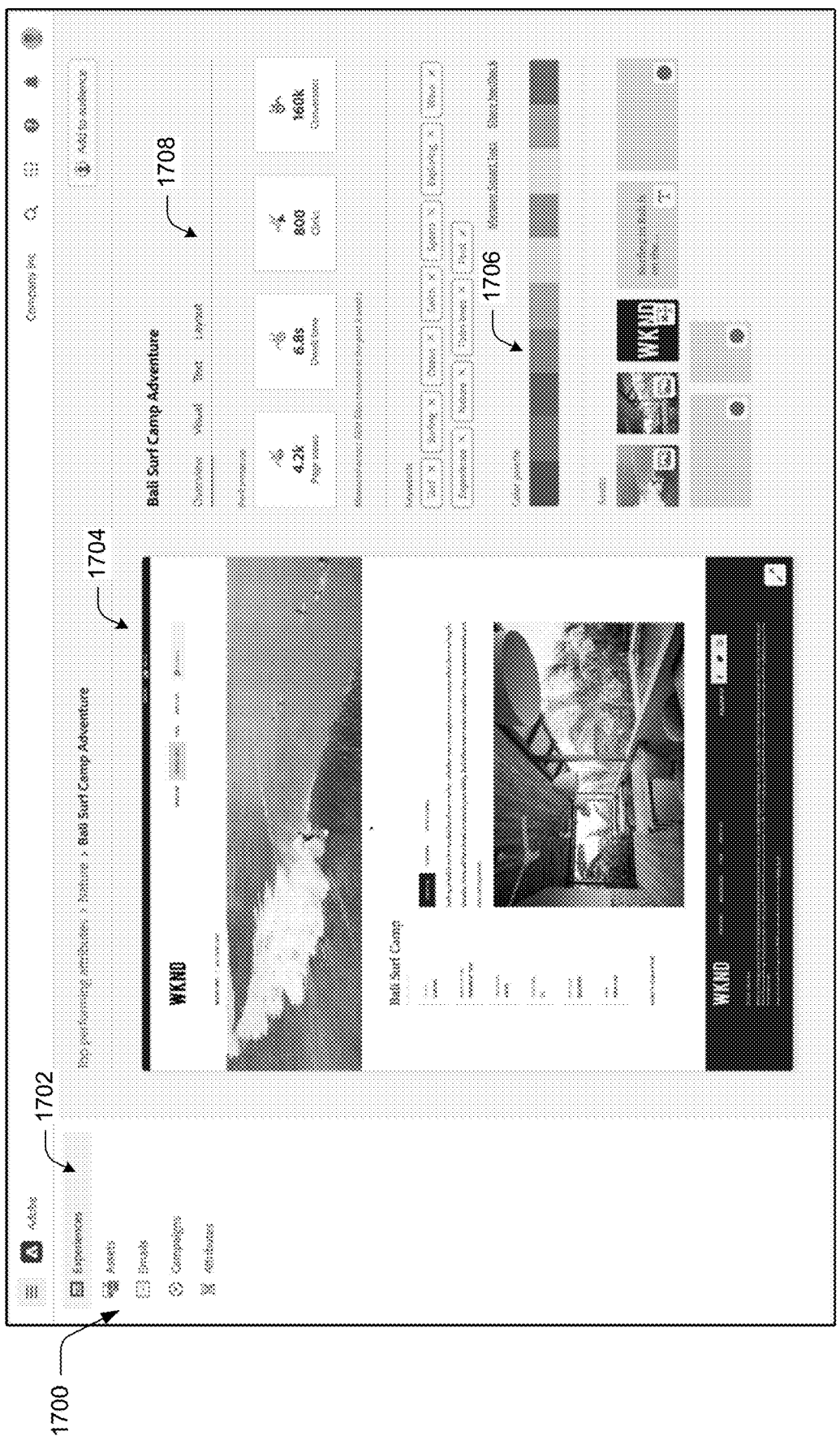
FIG. 17 depicts an example implementation of a user interface depicting top performing experiences.
Figure 18:
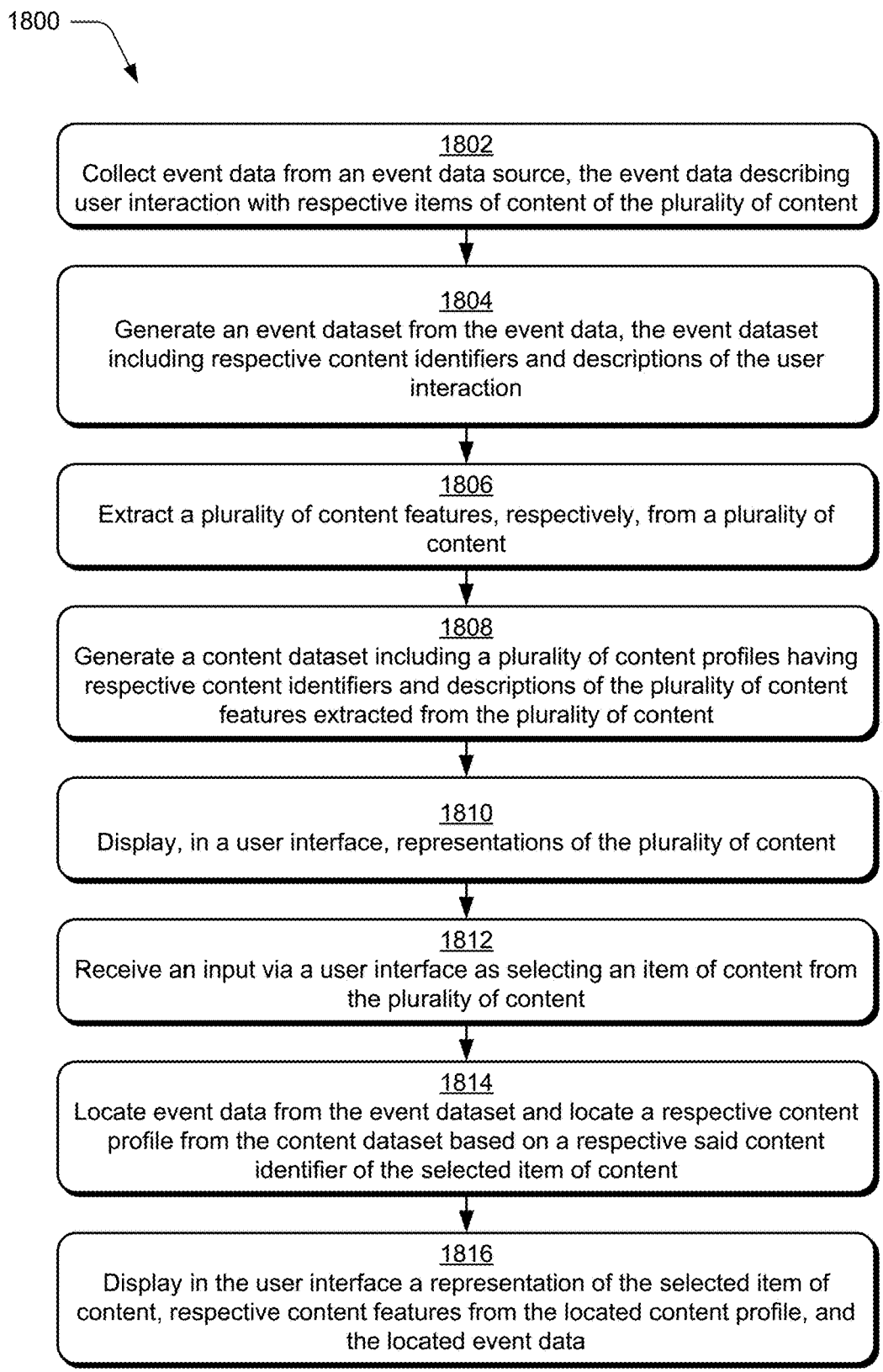
FIG. 18 is a flow diagram depicting a procedure in an example implementation of generation of a content dataset and an event dataset usable to generate an analytics user interface.

FIG. 17 depicts an example implementation of a user interface 1700 depicting top performing experiences. Responsive to selection of an "experiences" option 1702, a user interface 1700 is generated by the analytics user interface module 130 and displayed that includes a representation 1704 of the selected item of content, a representation 1706 of respective content features from the located content profile, and representations 1708 of the located event data.

The representation 1704 of the selected item of content, for instance, depicts a webpage. Representations 1706 of the respective content features includes a color palette used by the content. Examples of representations 1708 of the located event data include performance indicators including a number of page views, an amount of dwell time, a number of clicks, and a number of conversions. Additional information includes keywords used to "tag" the content. In this way, the analytics user interface module 130 is configured to leverage the event dataset 204 and the content dataset 208 in providing insights into content features and effects of the content features on achieving a desired result. A variety of other examples are also contemplated, including use as part of a content creation service 114 as further described in the following description.

Content Edits and Event Data Updates as part of Content Creation

Figure 19:
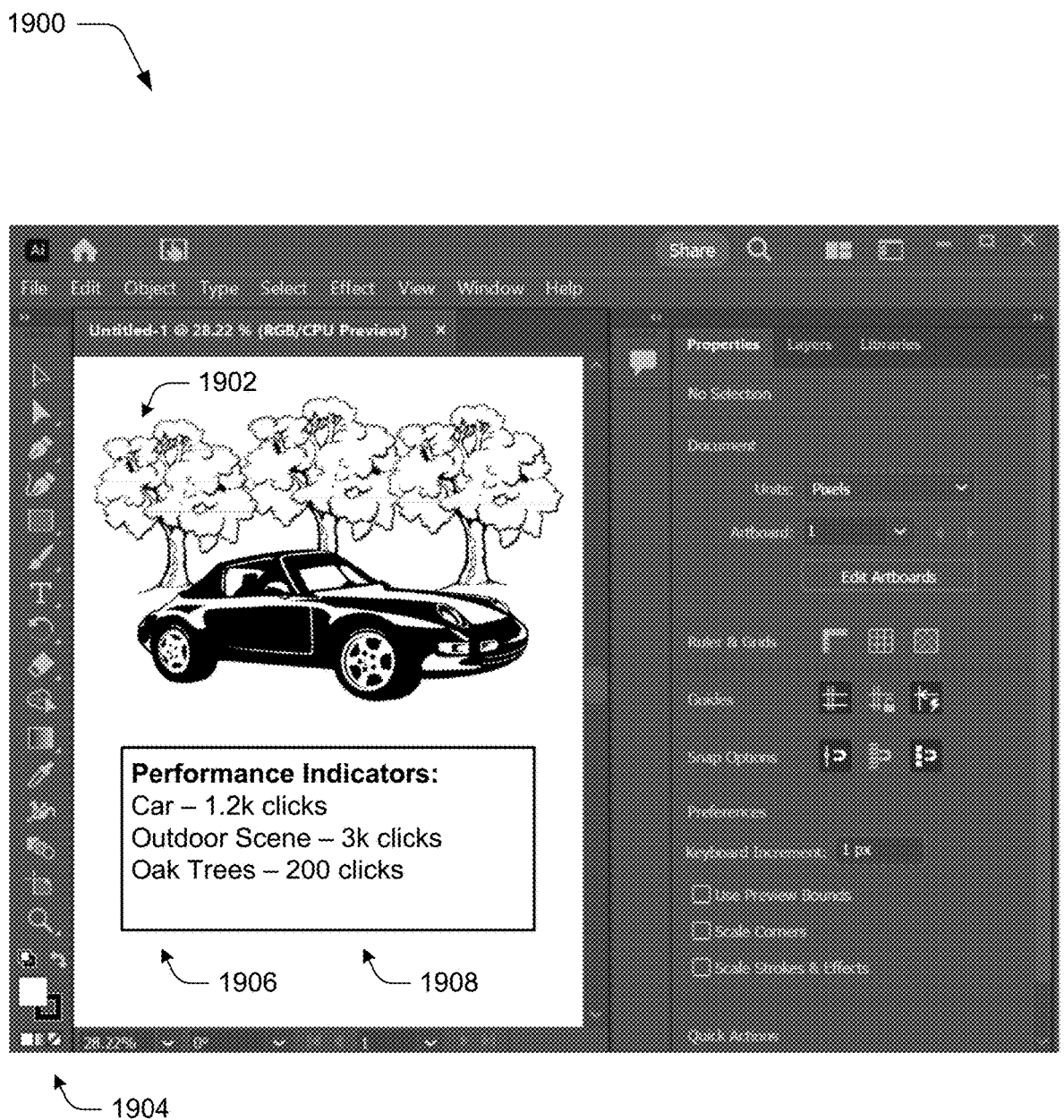
FIG. 19 depicts an example of a user interface configured to leverage content analytics as part of content creation in which an edit is received to a content feature of the content.
Figure 20:
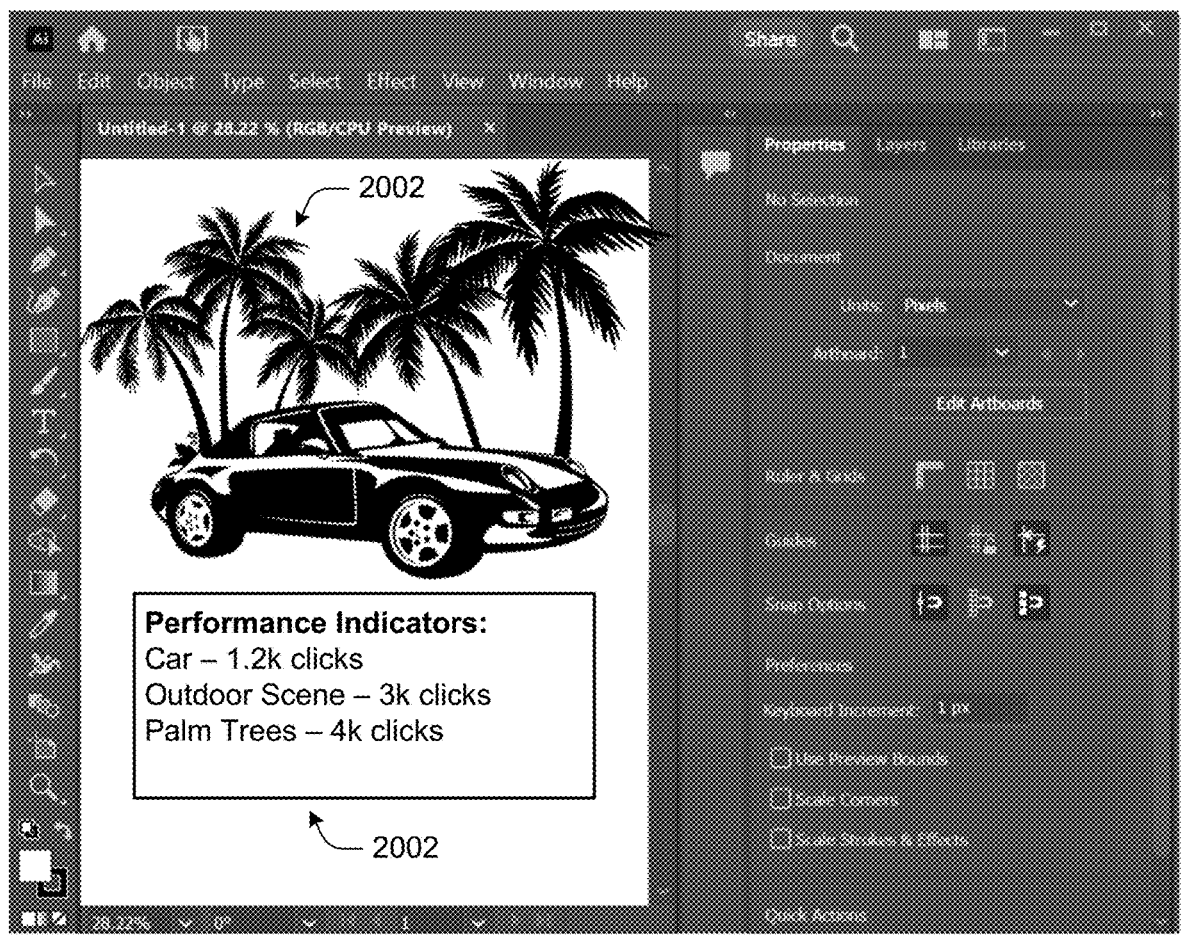
FIG. 20 depicts a user interface in which the content feature of the item of content is edited based on an input of FIG. 19 and performance indicators associated with the content feature are updated.
Figure 21:
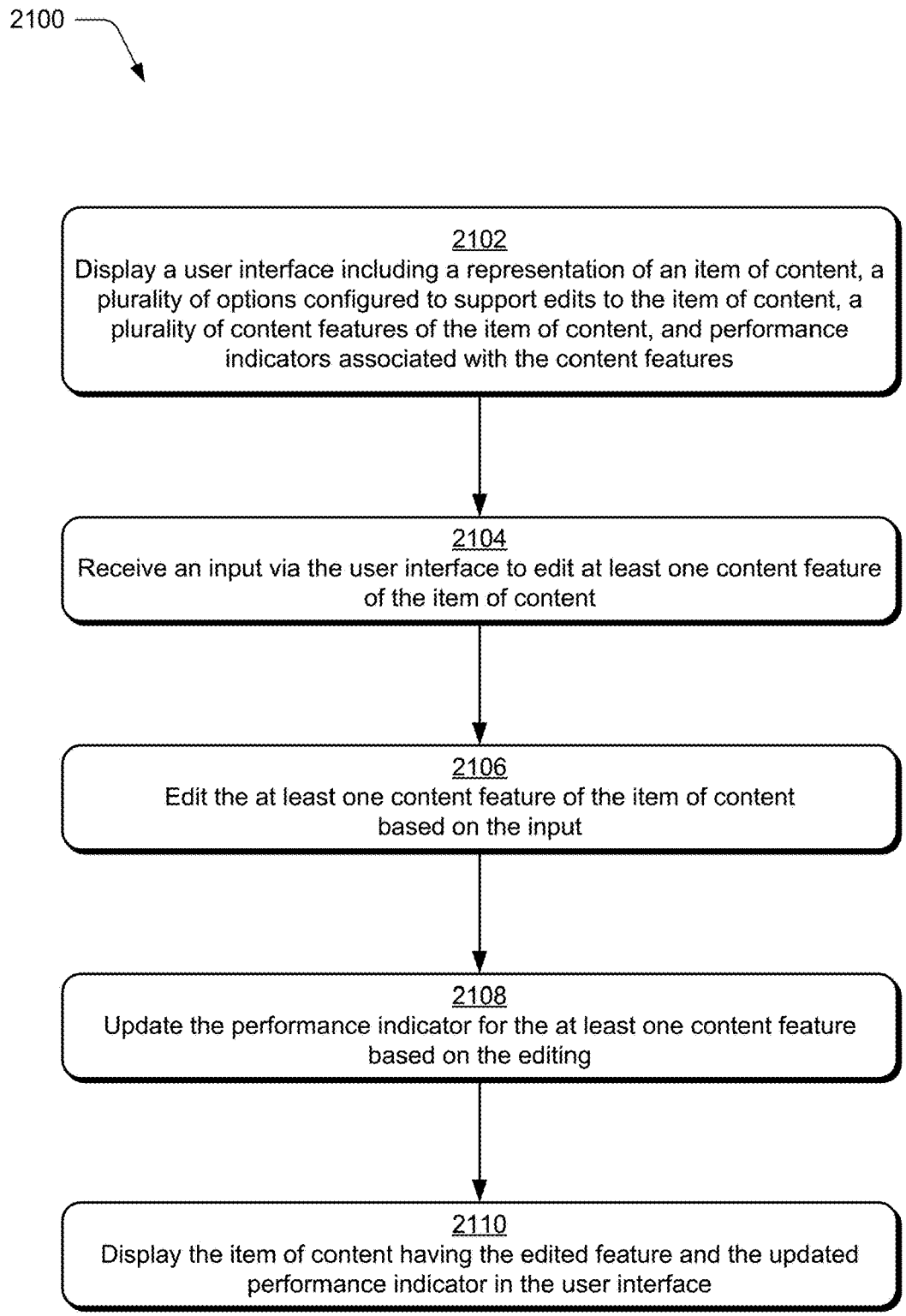
FIG. 21 depicts a procedure in an example implementation of an edit made to a content feature of content as part of content creation along with an update made to a performance indicator based on the edit to the content feature.

FIG. 19 depicts an example of a user interface 1900 configured to leverage content analytics as part of content creation in which an edit is received to a content feature of the content. FIG. 20 depicts an example of a user interface 2000 configured to update a performance indicator of a content feature based on an edit received via FIG. 19. FIG. 21 depicts a procedure 2100 in an example implementation of an edit made to a content feature of content as part of content creation along with an update made to a performance indicator based on the edit to the content feature. In the following discussion, reference to the procedure 2100 is made in parallel to the user interfaces 1900, 2000 of FIGS. 19 and 20.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

To begin in FIG. 19, a user interface 1900 is displayed including a representation 1902 of an item of content, a plurality of options 1904 configured to support edits to the item of content, and representations of a plurality of content features 1906 of the item of content, and representations of performance indicators 1908 associated with the content features (block 2102). The plurality of options 1904 in this example are configured to make edits to visual characteristics of the content, e.g., line weight, color, layers, transparency, and so forth.

Examples of the content features include "car," "outdoor scene," and "oak trees" that are obtained from a content dataset 208. Representation of the performance indicators 1908 are obtained by the analytics user interface module 130 from an event dataset 204, which in this instance describe a number of clicks associated with each content feature. An input is received via a user interface to edit at least one content feature of the item of content (block 2104). The input, for instance, is used to replace the oak trees with palm trees.

FIG. 20 depicts a user interface 2000 in which the content feature of the item of content is edited based on the input (block 2106), e.g., the oak trees are replaced with palm trees 2002. In response, the analytics user interface module 130 updates the performance indicator for the at least one content feature based on the edit (block 2108), e.g., "Palm Trees—4k clicks." The item of content is displayed in the user interface as having the edited feature (e.g., the palm trees) along with the updated performance indicator (block 2110), e.g., the number of clicks. In this way, the event analytics module 126, content analytics module 128, and the analytics user interface module 130 of the content analytics system 120 support real time output of insights usable to guide content creation, which is not possible in conventional techniques.

Example System and Device

Figure 22:
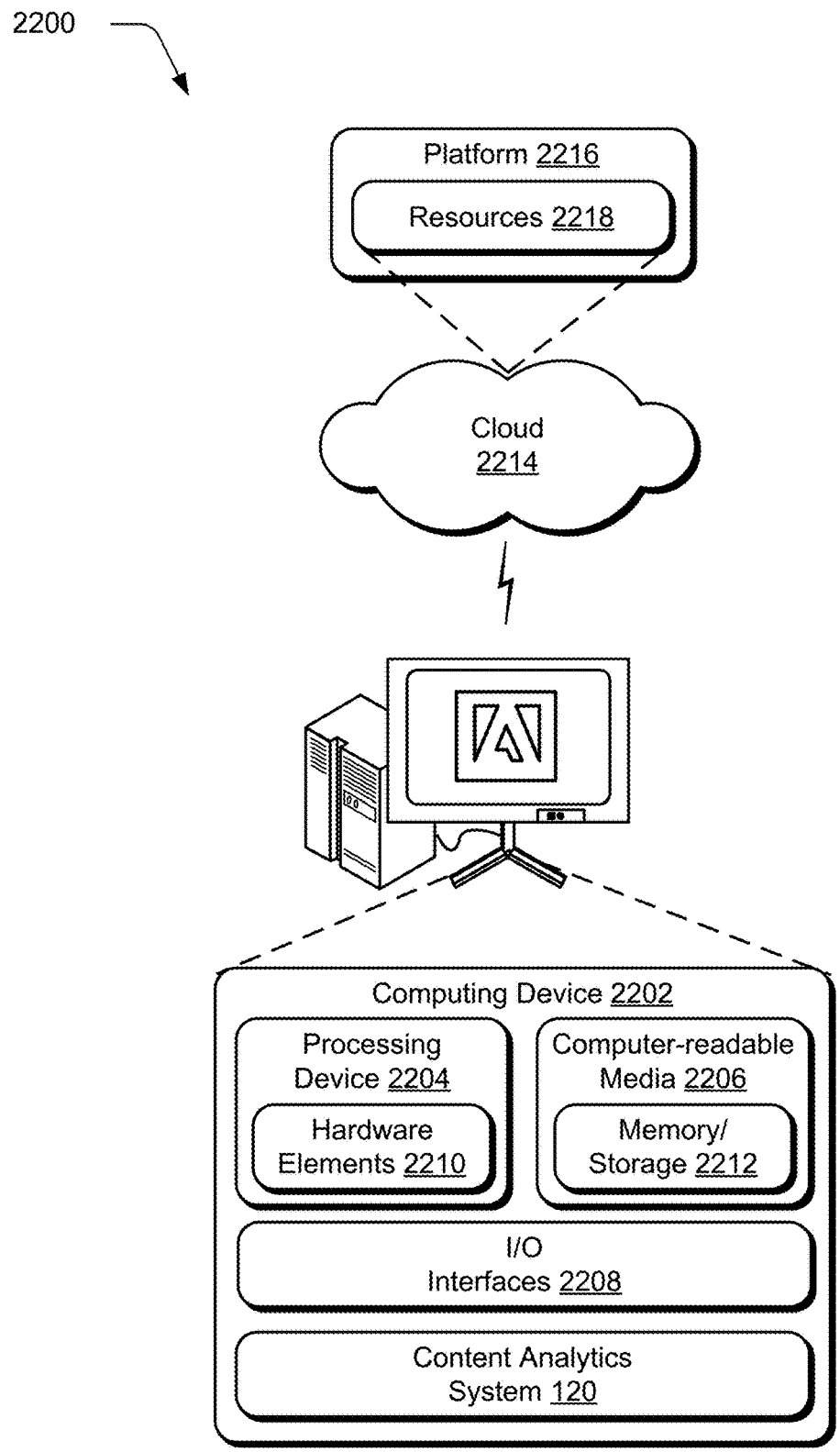
FIG. 22 illustrates an example system including various components of an example device that can be implemented as any type of computing device as described and/or utilize with reference to FIGS. 1-21 to implement embodiments of the techniques described herein.

FIG. 22 illustrates an example system generally at 2200 that includes an example computing device 2202 that is representative of one or more computing systems and/or devices that implement the various techniques described herein. This is illustrated through inclusion of the content analytics system 120. The computing device 2202 is configurable, for example, as a server of a service provider, a device associated with a client (e.g., a client device), an on-chip system, and/or any other suitable computing device or computing system.

The example computing device 2202 as illustrated includes a processing device 2204, one or more computer-readable media 2206, and one or more I/O interface 2208 that are communicatively coupled, one to another. Although not shown, the computing device 2202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 2204 is representative of functionality to perform one or more operations using hardware. Accordingly, the processing device 2204 is illustrated as including hardware element 2210 that is configurable as processors, functional blocks, and so forth. This includes implementation in hardware as an application specific integrated circuit or other logic device formed using one or more semiconductors. The hardware elements 2210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 2206 is illustrated as including memory/storage 2212 that stores instructions that are executable to cause the processing device 2204 to perform operations. The memory/storage 2212 represents memory/storage capacity associated with one or more computer-readable media. The memory/storage 2212 includes volatile media (such as random access memory (RAM)) and/or nonvolatile media (such as read only memory (ROM), Flash memory, optical disks, magnetic disks, and so forth). The memory/storage 2212 includes fixed media (e.g., RAM, ROM, a fixed hard drive, and so on) as well as removable media (e.g., Flash memory, a removable hard drive, an optical disc, and so forth). The computer-readable media 2206 is configurable in a variety of other ways as further described below.

Input/output interface(s) 2208 are representative of functionality to allow a user to enter commands and information to computing device 2202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 2202. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 2202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2210 and computer-readable media 2206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 2210. The computing device 2202 is configured to implement particular instructions and/or functions corresponding to the software and/or hardware modules. Accordingly, implementation of a module that is executable by the computing device 2202 as software is achieved at least partially in hardware, e.g., through use of computer-readable storage media and/or hardware elements 2210 of the processing device 2204. The instructions and/or functions are executable/operable by one or more articles of manufacture (for example, one or more computing devices 2202 and/or processing devices 2204) to implement techniques, modules, and examples described herein.

The techniques described herein are supported by various configurations of the computing device 2202 and are not limited to the specific examples of the techniques described herein. This functionality is also implementable all or in part through use of a distributed system, such as over a "cloud" 2214 via a platform 2216 as described below.

The cloud 2214 includes and/or is representative of a platform 2216 for resources 2218. The platform 2216 abstracts underlying functionality of hardware (e.g., servers) and software resources of the cloud 2214. The resources 2218 include applications and/or data that can be utilized while computer processing is executed on servers that are remote from the computing device 2202. Resources 2218 can also include services provided over the Internet and/or through a subscriber network, such as a cellular or Wi-Fi network.

The platform 2216 abstracts resources and functions to connect the computing device 2202 with other computing devices. The platform 2216 also serves to abstract scaling of resources to provide a corresponding level of scale to encountered demand for the resources 2218 that are implemented via the platform 2216. Accordingly, in an interconnected device embodiment, implementation of functionality described herein is distributable throughout the system 2200. For example, the functionality is implementable in part on the computing device 2202 as well as via the platform 2216 that abstracts the functionality of the cloud 2214.

In implementations, the platform 2216 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a content analytics module implemented using a processing device and configured to generate a content dataset including a plurality of content profiles having respective content identifiers and descriptions of a plurality of content features extracted, respectively, from the plurality of content using a plurality of machine-learning models configured as classifiers that are trained for identifying respective content features of the plurality of content features;
an event analytics module implemented using the processing device and configured to generate an event dataset from event data, the event dataset including respective content identifiers and performance indicators quantifying performance of the respective said content features towards achieving an action;
an analytics user interface module implemented using the processing device and configured to display an analytics user interface that is configured to:
 receive an input via an analytics user interface as selecting an item of content from the plurality of content;
 locate event data from the event dataset and a respective said content profile from the content dataset based on a respective said content identifier of the selected item of content; and
 display in the analytics user interface a representation of the selected item of content, respective said content features from the located respective said content profile, and the performance indicators quantifying performance of the respective said content features towards achieving the action.

2. The system as described in claim 1, further comprising a content processing source including theft plurality of machine-learning models configured to extract the plurality of content features from the plurality of content.

3. The system as described in claim 2, wherein the plurality of machine-learning models is configured as classifiers that are trained for identifying respective content features of the plurality of content features.

4. The system as described in claim 1, further comprising a content creation source configured to generate the plurality of content and extract one or more of the plurality of content features as part of generating the plurality of content.

5. The system as described in claim 4, wherein the content creation source includes a content translation module configured to translate a digital document having text and a digital image into markup language content, automatically and without user intervention.

6. The system as described in claim 5, wherein the markup language content is a webpage.

7. The system as described in claim 1, wherein the action involves an outcome of user interaction with content having the respective said content features.

8. The system as described in claim 1, wherein at least one said performance indicator quantifies a number of user interactions.

9. The system as described in claim 1, wherein the plurality of content features are visual characteristics.

10. A method comprising:
outputting, by a processing device, an analytics user interface including:
a representation of an item of content;
a plurality of options configured to support edits to the item of content;
a plurality of content features of the item of content extracted using a plurality of machine-learning models configured as classifiers that are trained for identifying respective content features of the plurality of content features; and
performance indicators associated with the content features, the performance indicators quantifying performance of the respective said content features towards achieving an action;
receiving, by the processing device, an input via the user interface to edit at least one said content feature of the item of content;
editing, by the processing device, the at least one said content feature of the item of content based on the input;
updating, by the processing device, the performance indicator quantifying performance of the at least one said content feature towards achieving the action based on the editing; and
outputting, by the processing device, the item of content having the edited feature and the updated performance indicator quantifying performance of the at least one said content feature towards achieving the action based on the editing for display in the analytics user interface.

11. The method as described in claim 10, further comprising translating a digital document having text and a digital image into the item of content configured as markup language content, automatically and without user intervention.

12. The method as described in claim 10, wherein the at least one said content feature is a visual characteristic of the item of content.

13. The method as described in claim 10, wherein the item of content is a digital image.

14. The method as described in claim 10, further comprising extracting the plurality of content features from the item of content, automatically and without user intervention.

15. The method as described in claim 14, wherein the extracting is performed using a plurality of machine-learning models configured as classifiers that are trained for identifying respective content features of the plurality of content features.

16. One or more computer-readable storage media having instructions stored thereon that, responsive to execution by a processing device, causes the processing device to perform operations including:
extracting a plurality of content features, respectively, from a plurality of content, the extracting performed using a plurality of machine-learning models configured as classifiers that are trained for identifying respective content features of the plurality of content features;
generating a content dataset including a plurality of content profiles having respective content identifiers and descriptions of the plurality of content features extracted from the plurality of content;
collecting event data from an event data source, the event data describing user interaction with respective items of content of the plurality of content;
generating an event dataset from the event data, the event dataset including respective content identifiers and descriptions of the user interaction, the event dataset includes at least one performance indicator, configured for display in an analytics user interface, quantifying performance of the respective said content features towards achieving an action; and
generating an item of content using generative artificial intelligence (AI) as implemented by a machine-learning model based on the content dataset and the event dataset.

17. The one or more computer-readable storage media as described in claim 16, wherein the extracting is performed using the plurality of machine-learning models configured as classifiers that are trained for identifying respective content features of the plurality of content features.

18. The one or more computer-readable storage media as described in claim 16, wherein the operations further comprise translating a plurality of digital documents having text and a digital image into the plurality of content configured using a markup language, automatically and without user intervention.

19. The one or more computer-readable storage media as described in claim 16, wherein item of content is a digital image.

20. The one or more computer-readable storage media as described in claim 16, wherein the action involves an outcome of user interaction with content having the respective said content features.

* * * * *

UNITED STATES PATENT AND TRADEMARK OFFICE
CERTIFICATE OF CORRECTION

| | |
|---|---|
| PATENT NO. | : 11,907,508 B1 |
| APPLICATION NO. | : 18/133725 |
| DATED | : February 20, 2024 |
| INVENTOR(S) | : Yaman Kumar et al. |

It is certified that error appears in the above-identified patent and that said Letters Patent is hereby corrected as shown below:

In the Claims

Column 18, Line 59, after "source including", delete "theft", insert -- "the" --, therefor.

Signed and Sealed this
Thirtieth Day of April, 2024

Katherine Kelly Vidal
*Director of the United States Patent and Trademark Office*